(12) United States Patent
Nagata et al.

(10) Patent No.: US 8,040,458 B2
(45) Date of Patent: Oct. 18, 2011

(54) PLANAR ILLUMINATION DEVICE AND LIQUID CRYSTAL DISPLAY DEVICE USING THE SAME

(75) Inventors: Takayuki Nagata, Osaka (JP); Tatsuo Itoh, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 12/439,435

(22) PCT Filed: Sep. 18, 2007

(86) PCT No.: PCT/JP2007/068053
§ 371 (c)(1),
(2), (4) Date: Feb. 27, 2009

(87) PCT Pub. No.: WO2008/038539
PCT Pub. Date: Apr. 3, 2008

(65) Prior Publication Data
US 2010/0014022 A1 Jan. 21, 2010

(30) Foreign Application Priority Data

Sep. 26, 2006 (JP) ................. 2006-260226
Oct. 16, 2006 (JP) ................. 2006-281082

(51) Int. Cl.
*G02F 1/1335* (2006.01)
*F21V 7/04* (2006.01)
(52) U.S. Cl. ......................... 349/62; 362/606

(58) Field of Classification Search .................... 349/57, 349/62, 85, 96, 98, 71, 115, 18; 362/555, 362/610–613, 619, 606; 353/31, 627, 629
See application file for complete search history.

(56) References Cited

U.S. PATENT DOCUMENTS
5,601,351 A * 2/1997 van den Brandt ............... 353/20
(Continued)

FOREIGN PATENT DOCUMENTS
JP 11-345691 12/1999
(Continued)

OTHER PUBLICATIONS
International Search Report issued Oct. 16, 2007 in the International (PCT) Application No. PCT/JP2007/068053.

*Primary Examiner* — Akm Ullah
(74) *Attorney, Agent, or Firm* — Wenderoth, Lind & Ponack, L.L.P.

(57) ABSTRACT

A planar illumination device for illuminating a liquid crystal display panel provided with a polarizing plate on a light incident side, includes: a light source unit for emitting light having a specified polarization direction; and a light irradiating member for deflecting light emitted from the light source unit and irradiating the liquid crystal display panel with the deflected light, wherein the light irradiating member deflects the light emitted from the light source unit such that the polarization direction of the light emitted from the light source unit substantially coincides with a transmission axis direction of the polarizing plate of the liquid crystal display panel.

20 Claims, 16 Drawing Sheets

U.S. PATENT DOCUMENTS

| | | | |
|---|---|---|---|
| 5,621,551 A * | 4/1997 | Henderson et al. | 349/7 |
| 6,504,589 B1 * | 1/2003 | Kashima et al. | 349/96 |
| RE38,305 E * | 11/2003 | Gunjima et al. | 349/9 |
| 6,646,806 B1 * | 11/2003 | Bierhuizen | 359/618 |
| 2009/0190070 A1 * | 7/2009 | Nagata et al. | 349/65 |
| 2009/0316431 A1 * | 12/2009 | Nagata et al. | 362/609 |
| 2010/0026929 A1 * | 2/2010 | Nagata et al. | 349/61 |
| 2010/0220261 A1 * | 9/2010 | Mizushima et al. | 349/64 |

FOREIGN PATENT DOCUMENTS

| | | |
|---|---|---|
| JP | 2001-215495 | 8/2001 |
| JP | 2005-129241 | 5/2005 |
| JP | 2006-40639 | 2/2006 |
| JP | 2006-47829 | 2/2006 |
| JP | 2006-235288 | 9/2006 |
| JP | 2006-244803 | 9/2006 |

* cited by examiner

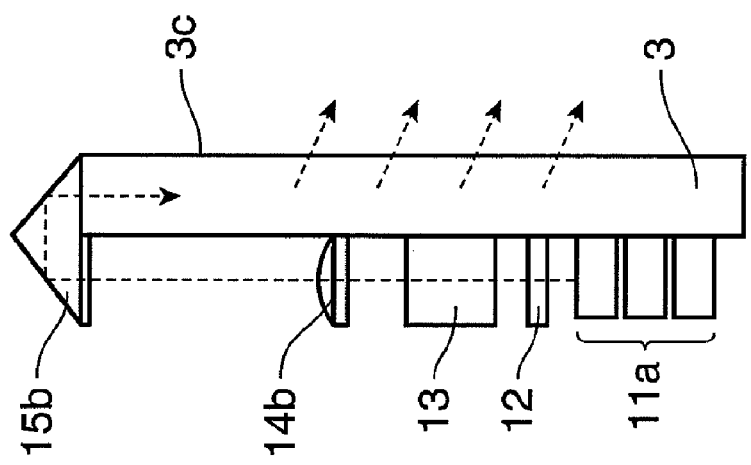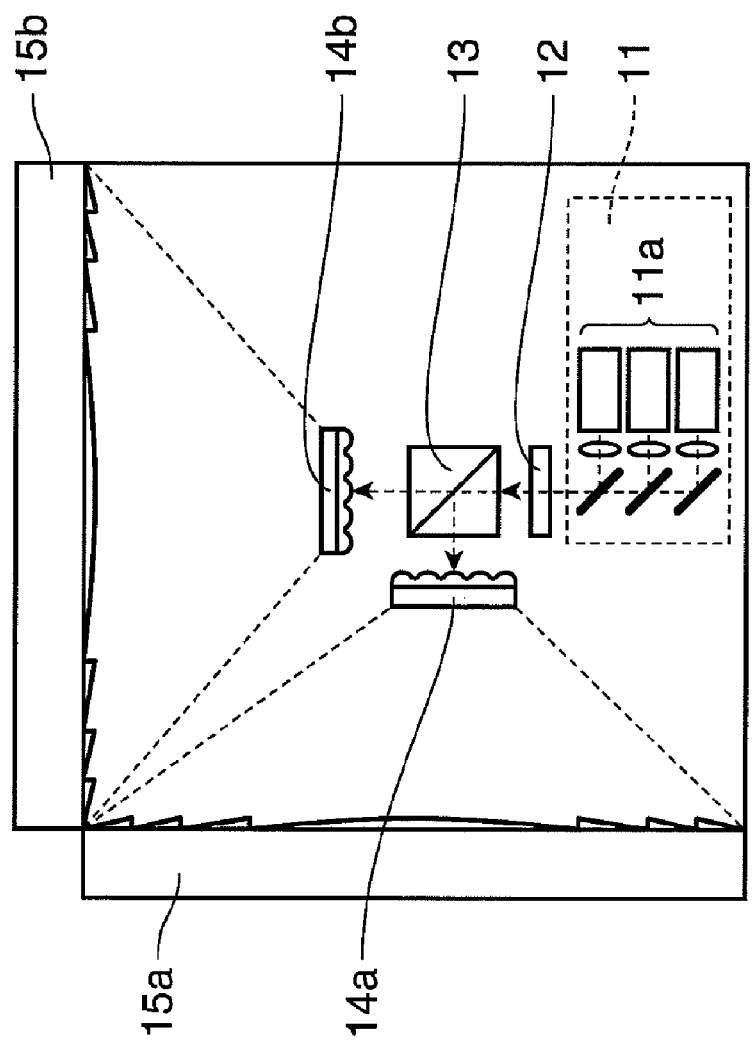

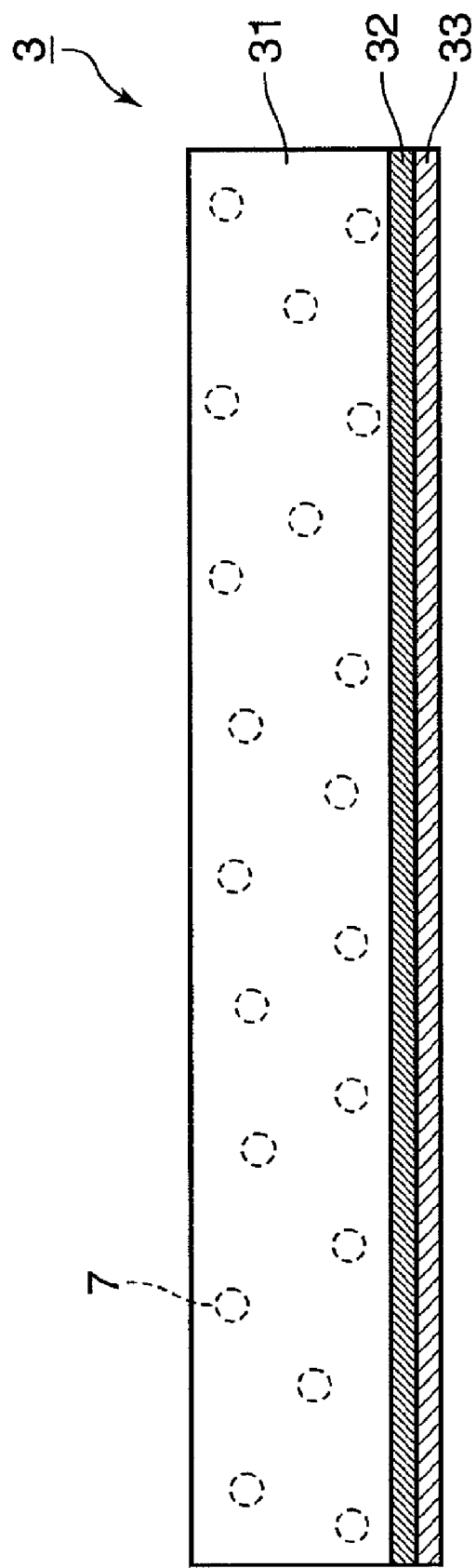

PLANAR ILLUMINATION DEVICE AND LIQUID CRYSTAL DISPLAY DEVICE USING THE SAME

FIELD OF TECHNOLOGY

The present invention relates to a planar illumination device suitable as a backlight of a thin flat display used in a television set or the like, and a liquid crystal display device using the same.

DESCRIPTION OF THE BACKGROUND ART

Conventionally, backlight illumination devices utilizing a cold cathode fluorescent tube have been widely used in liquid crystal display devices using liquid crystal display panels. In recent years, attention has been focused on backlight illumination devices using three color light emitting diodes (LED devices) of red, green and blue lights for the reproduction of more clear and natural color tones, and the development thereof has been vigorously promoted.

A planar illumination device of the lateral light source type so-called edge light type in which light from a light source is incident through a side surface (light incident surface) of a light guide plate and light is emitted from one principal surface (light output surface) of the light guide plate for illumination is used as a backlight illumination device with a relatively small size. On the other hand, a direct illumination device in which cathode fluorescent tubes or LED devices are arranged in a planar manner is used for backlight illumination requiring a large size and a high luminance.

A demand for liquid crystal display devices with thin and large screens such as wall mounted TVs is thought to increase in the future. However, in order to realize this, direct illumination devices have a problem of being difficult to be thinned and edge light type illumination devices using conventional light sources have a problem of being unable to ensure a sufficient luminance if screens are large.

To realize a liquid crystal display device with a thin large screen, researches have started on an edge light type backlight using a laser light source, which provides high luminance and which is suited for a high power output.

Furthermore, in order to realize a still higher luminance and lower power consumption, the methods for better utilization of a backlight illumination has been considered. For example, Patent Document 1 discloses a method improving the light utilization efficiency of a liquid crystal display device by providing LEDs with polarization anisotropy.

However, the foregoing conventional structure of Patent Document 1 has the following drawbacks. That is, according to Patent Document 1, since a light is incident on a light guide plate from only one direction, a problem of non-uniform luminance is liable to occur when applied to a large size screen. A problem of non-uniform color is also liable to occur due to differences in absorption when three color lights, i.e., red, green and blue lights propagate in the light guide plate.

As described above, the enlargement of thin flat displays represented by plasma displays and liquid crystal displays have been promoted at a rapid pace in recent years. A direct illumination device in which cathode fluorescent tubes are arranged in a planar manner has been conventionally used as a backlight of a liquid crystal display device requiring a large size and a high luminance. Power consumption thereof tends to increase substantially in proportion to the screen size. Furthermore, the power consumption of the backlight accounts for the large proportion of the total power consumption of the liquid crystal display device, and the problem of the power consumption has been a curtail issue for the liquid crystal display device.

In recent years, attention has been also focused on backlight illumination using light emitting diodes (LED devices) of three primary colors for the reproduction of more clear and natural color tones. Incidentally, a planar illumination device of the lateral light source type, a so-called "edge light type" has been used as a conventional backlight illumination device with a relatively small size wherein a light emitted from a light source is incident on the light guide plate through a side surface thereof and a light is outputted from one principal surface of the light guide plate to be used for illumination. Here, an attempt has been made to apply the foregoing edge light type illumination device to a thin large screen by adopting high-output laser light sources. However, such applications adopting the light-output laser light sources have a drawback in that the required power consumption is larger than that of cathode fluorescent tubes at present, and a reduction in power consumption is therefore a critical issue.

In response, various methods have been proposed to realize a reduction in power consumption. examples of which includes the method of reducing the power consumption by controlling the backlight luminance by limiting the maximum luminance of the backlight, or the method of reducing the power consumption by improving the utilization of the backlight luminance utilizing polarized lights (for example, Patent Document 1).

However, there still exists a strong demand for a reduction in power consumption, and with the foregoing conventional methods, the power consumption cannot be reduced to a sufficient level to meet such demands.

Patent Document 1:
Japanese Unexamined Patent Publication No. 2006-40639

DISCLOSURE OF THE INVENTION

An object of the present invention is to provide a planar illumination device, which realizes a high light utilization efficiency and low power consumption by improving the transmission efficiency of a liquid crystal display panel.

A planar illumination device according to one aspect of the present invention for illuminating a liquid crystal display panel provided with a polarizing plate on a light incident side, includes: a light source unit for emitting light having a specified polarization direction; and a light irradiating member for deflecting light emitted from the light source unit and irradiating the liquid crystal display panel with the deflected light, wherein the light irradiating member deflects the light emitted from the light source unit such that the polarization direction of the light emitted from the light source unit substantially coincides with a transmission axis direction of the polarizing plate of the liquid crystal display panel.

According to the foregoing structure of the planar illumination device, the liquid crystal display panel is irradiated with the light emitted from the light source unit in such a manner that the polarization direction thereof is brought into substantially coincide with the transmission axis direction of the liquid crystal display panel. With this structure, the transmission efficiency of the liquid crystal display panel can be improved, thereby realizing a light utilization efficiency while reducing power consumption.

BRIEF DESCRIPTION OF THE DRAWINGS

FIGS. 4A and 4B are a rear view and a side view showing a schematic structure of a planar illumination device according to the second embodiment of the invention;

FIG. 7 is a section showing a schematic structure of a light guide plate used in a planar illumination device according to the fifth embodiment of the invention;

BEST MODES FOR EMBODYING THE INVENTION

Figure 1:
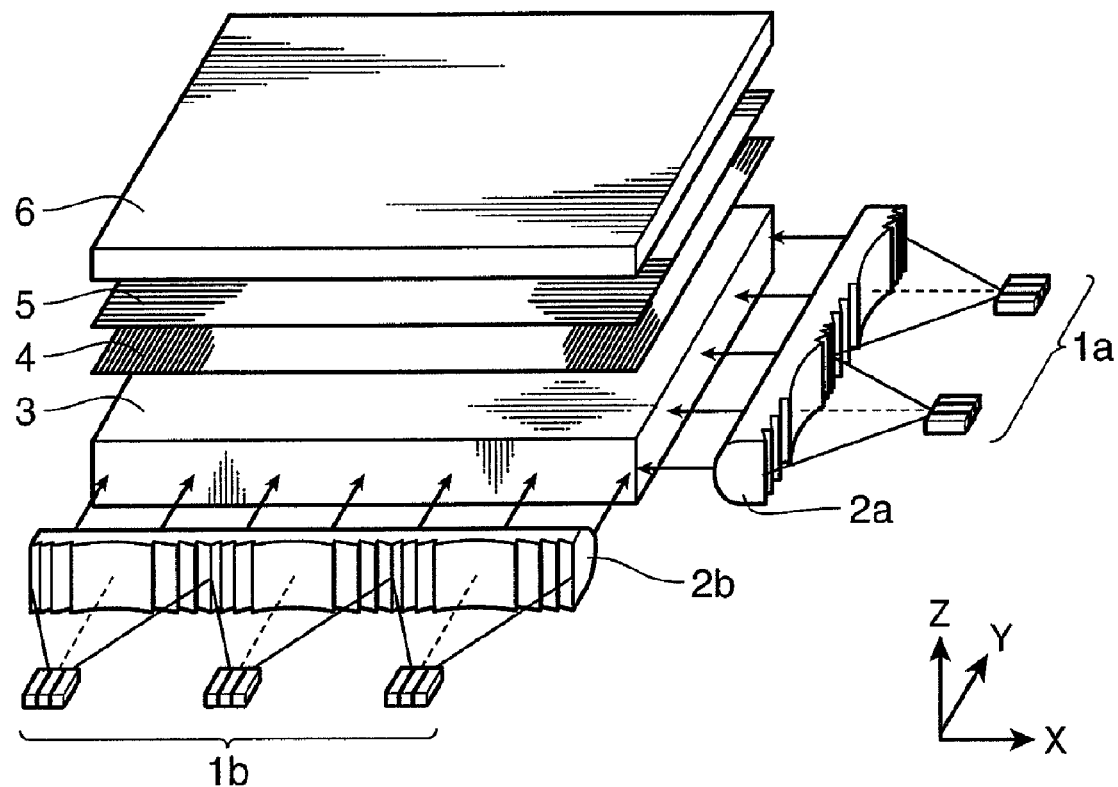
FIG. 1 is a perspective view showing a schematic structure of a planar illumination device according to the first embodiment of the invention.

Hereinafter, embodiments of the present invention are described with reference to the drawings. It should be noted here that the members having the same structures and the functions are designated by the same reference numerals, and explanations thereof may be omitted for convenience for explanations.

First Embodiment

FIG. 1 is a perspective view showing a schematic structure of a planar illumination device according to the first embodiment of the present invention. FIG. 1 shows a liquid crystal display panel 6 to be illuminated with the planar illumination device of the present embodiment and prism sheets 4, 5 arranged between the planar illumination device of the present embodiment and the liquid crystal display panel 6 in addition to the planar illumination device of the present embodiment.

As shown in FIG. 1, the planar illumination device according to the present embodiment includes linear light source units 1a and 1b, cylindrical lenses 2a and 2b, and a light guide plate 3. The linear light source unit 1a includes two laser light sources arranged in the Y-direction in FIG. 1, and laser lights emitted from the respective laser light sources are outputted to the cylindrical lens 2a while being converted into linear lights, for example, using cylindrical lenses (not shown). The respective laser light sources of the linear light source unit 1a emit lights of three primary colors, i.e., red, green and blue lights. The linear light source unit 1b includes three laser light sources arranged in the X-direction shown in FIG. 1, and laser lights from the respective laser light sources are emitted to the cylindrical lens 2b while being converted into linear lights, for example, using unillustrated cylindrical lenses. The respective laser light sources of the linear light source unit 1a emit lights of three primary colors, i.e., red, green and blue lights.

The cylindrical lenses 2a and 2b are made up of Fresnel lenses, which form lights radially emitted from the linear light source units 1a and 1b and incident thereon into substantially parallel lights, and output them to be incident on the light incident surface of the light guide plate 3. The light guide plate 3 receives lights emitted from the cylindrical lenses 2a and 2b through the end surface (the light incident surface) thereof, and outputs them to the liquid crystal display panel 6 from one of the principal surface thereof. In the light guide plate 3A, a multitude of isotropic scattering elements having no directivity are formed uniformly, whereby the incident lights can be equally polarized in every direction by an optical phenomenon such as reflection, scattering, refraction or diffraction caused by these scattering elements. The scattering elements can be realized, for example, by forming scattering particles made of thermosetting resin or thermoplastic resin in the light guide plate 3 or generating bubbles or the like in the light guide plate 3.

In the present embodiment, the linear light source unit 1a is arranged so as to emit respective red, green and blue lights as polarized lights in the Z-direction, whereas the linear light source unit 1b is arranged so as to emit respective red, green and blue lights as polarized lights in the X-direction. In this example, the laser light sources are used for the linear light source units 1a and 1b. However, the present embodiment is not intended to be limited to this structure, and for example, LED devices which emit lights of three primary colors, i.e., red, green and blue lights may be used as the light sources. In this case, lights emitted from the LED devices may be polarized in the similar manner as the laser lights, for example, using polarizing elements.

Figure 2:
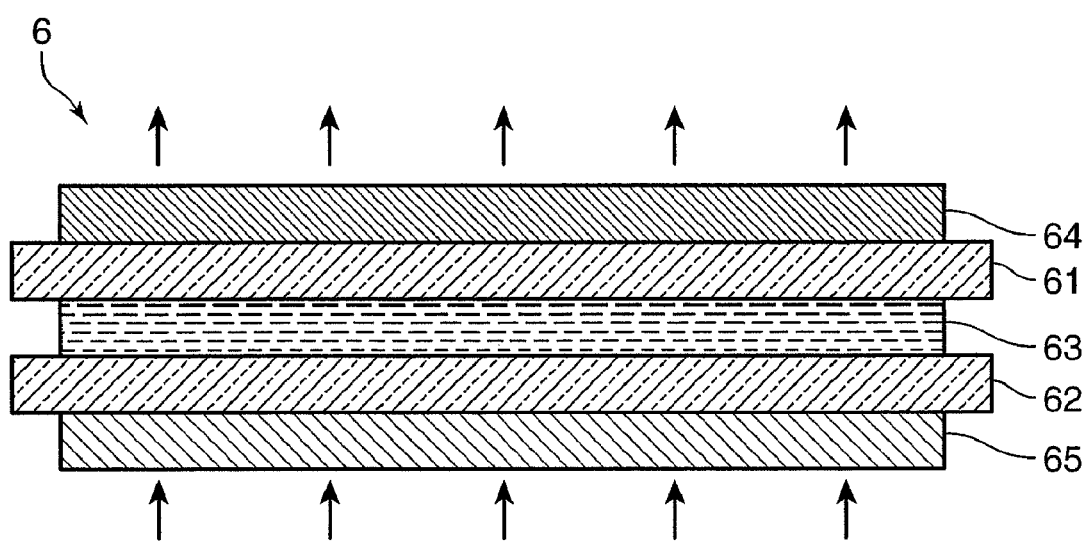
FIG. 2 is a section showing a schematic structure of a liquid crystal display panel.

FIG. 2 shows a schematic structure of the liquid crystal display panel 6. The liquid crystal display panel 6 has such a general structure that transparent electrodes (not shown) and liquid crystal molecules 63 are formed between glass substrates 61 and 62. Further, the polarizing plate 64 and the polarizing plate 65 having different transmission axes are formed on the light output side and the right incident side respectively, so as to sandwich the glass substrates 61 and 62. The transmission axes of the polarizing plates 64 and 65 are substantially orthogonal to each other. The transmission axis of the polarizing plate 65 at the light incident side extends in the X-direction.

According to the planar illumination device of the present embodiment, Z-direction polarized lights as emitted from the linear light source unit 1a are formed into substantially parallel lights in an XY plane by the cylindrical lens 2a, and are guided to the light guide plate 3. On the other hand, X-direction polarized lights emitted from the linear light source unit 1b are converted into substantially parallel lights in an XY plane by the cylindrical lens 2b, and are guided to the light guide plate 3.

The lights entered into the light guide plate 3 are polarized by the scattering elements formed in the light guide plate 3, and are outputted from the light guide plate 3. Here, since the scattering elements are formed uniformly in the light guide plate 3, it is possible to output uniform lights from the light guide plate 3 by inputting thereto substantially parallel lights. According to the foregoing structure of the present embodiment, since the lights are entered into the light guide plate 3 from two directions orthogonal to each other, it is possible to output more uniform lights.

The lights outputted from the light guide plate 3 are incident on the liquid crystal display panel 6 after passing through the prism sheets 4 and 5. The prism sheet 4 polarizes an output angle in the X-direction, whereas the prism sheet 5 polarizes an output angle in the Y-direction. Accordingly, the lights emitted from the light guide plate 3 are incident on the liquid crystal display panel 6 after having an output angle distribution in the X-direction corrected by the prism sheet 4 and having an output angle distribution in the Y-direction corrected by the prism sheet 5.

With the conventional planar illumination device using cathode tubes or LEDs, since the lights incident on the liquid crystal display panel are not polarized, an amount of lights passing through a polarizing plate on the light incident side of a liquid crystal display panel becomes ½ of the total amount of incident lights. In contrast, according to the planar illumination device of the present embodiment, most of the lights outputted from the light guide plate 3 pass through the polarizing plate 65 on the incident side of the liquid crystal display panel 6, for the reasons explained below.

Figure 3:
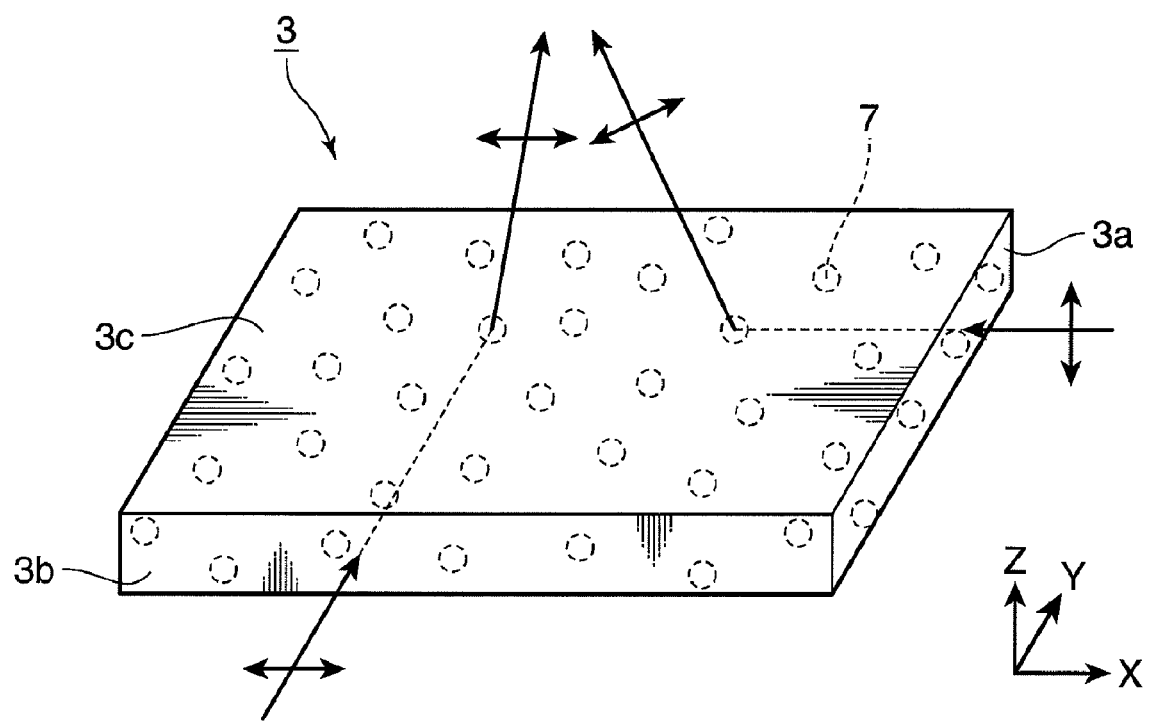
FIG. 3 is a diagram showing polarized lights of incident lights and output lights on and from a light guide plate.

FIG. 3 is a typical depiction showing polarized lights of incident lights on and output lights from the light guide plate 3. In FIG. 3, a light emitted from the linear light source unit 1a is incident on the light guide plate 3 through a light incident surface 3a thereof and light emitted from the linear light source unit 1b is incident on the light guide plate 3 through the light incident surface 3b of the light guide plate 3, and both of the incident lights are outputted from the light output source 3c of the light guide plate 3. The two light incident surfaces 3a and 3b of the light guide plate 3 are provided so as to be orthogonal to each other.

As shown in FIG. 3, the lights respectively entered in the light guide plate 3 through the light incident surfaces 3a and 3b are polarized as being reflected or refracted by scattering elements 7, and are outputted from the light output surface 3c.

Here, since the scattering elements 7 are formed in a shape without having any directivity, the lights entered from the X-direction and the Y-direction propagate toward the light output surface 3c with equal efficiency and most of lights are outputted while maintaining the polarization directions. It was confirmed also with the actual measurement that at least 80% of output light maintain their original polarization components when polarized light parallel to or vertical to a light output surface is incident on the end surface of the foregoing light guide plate containing scattering elements.

Accordingly, in the present embodiment, most of the Z-direction polarized lights entered through the light incident surface 3a become output lights having polarization planes in an XZ plane, most of the X-direction polarized lights entered through the light incident surface 3b become output lights polarized in the X-direction.

Since the X-direction polarized lights are not influenced in the prism sheets 4 and 5, the majority of the lights emitted from the light guide plate 3 pass through the polarizing plate 65 at the incident side of the liquid crystal display panel 6 which has the transmission axis in the X-direction. Assumed based on the actual measurement that at least 80% of the lights pass, the transmission efficiency can be improved 1.6 times as high as before.

As described above, according to the planar illumination device of the present embodiment, uniform luminance can be obtained over a large area and higher image quality is promoted by making lights incident on the light guide plate 3 from the two directions orthogonal to each other, and the polarizations of lights outputted from the light guide plate 3 can be aligned and the transmission efficiency of the liquid crystal display panel 6 can be improved by specifying incident polarized lights corresponding to the light incident surfaces of the light guide plate 3. As a result, a liquid crystal display device of lower power consumption can be realized.

Second Embodiment

Next, the second embodiment of the present invention is described. In the foregoing first embodiment, the linear light source units 1a and 1b are provided in the outside of the light guide plate 3 as shown in FIG. 1. In the present invention, a light source unit is arranged on the underside of the light guide plate 3 and lights are incident on the light guide plate 3 while being polarized by mirrors or the like. FIGS. 4A and 4B are a rear view and a side view respectively showing a schematic structure of a planar illumination device according to the present embodiment.

As shown in FIGS. 4A and 4B, the planar illumination device according to the present embodiment includes a light source unit 11, a half wave plate 12, a polarizing beam splitter 13, linearization optical elements 14a and 14b, prisms 15a and 15b and the light guide plate 3. The light source unit 11 combines and outputs lights having aligned polarizations from laser light sources 11a for three primary colors, and the half wave plate 12 rotates the polarizations of these lights emitted from the light source unit 11. The linearization optical elements 14a and 14b are made up or lenticular lenses, cylindrical lenses or the like, and the prisms 15a and 15b are provided for guiding the lights from the linearization optical elements 14a and 14b to the light guide plate 3. To these linearization optical elements 14a and 14b, cylindrical lenses which convert lights into parallel luminous fluxes are connected.

According to the planar illumination device of the present embodiment, lights emitted from the light source unit 11 are converted into polarized light having a polarization plane substantially at 45° with respect to the light output surface 3c of the light guide plate 3 by the half wave plate 12, and are output from the polarization beam splitter 13 after being split into P-polarized transmission light and S-polarized reflected light substantially at a ratio of 1:1 by the polarization beam splitter 13. The light having passed through or reflected from the polarization beam splitter 13 is expanded in a plane substantially parallel to the light guide plate 3 by the linearization optical element 14a or 14b and converted into parallel luminous flux by the prism 15a or 15b to be incident on the light guide plate 3.

According to the planar illumination device of the present embodiment, it is possible to generate linearly polarized light in any arbitrary direction and to freely change the transmission to reflection ratio by the polarization beam splitter 13 by adjusting the optical axis of the half wave plate 12.

Third Embodiment

Figure 5:
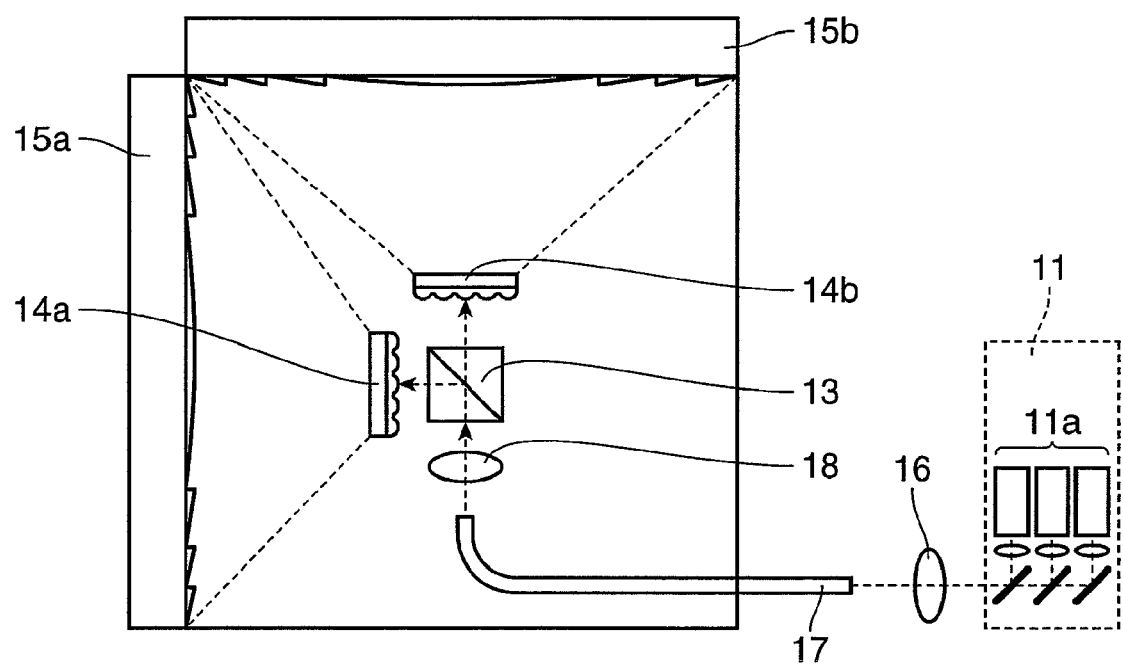
FIG. 5 is a rear view showing a schematic structure of a planar illumination device according to the third embodiment of the invention.

Next, the third embodiment of the present invention is described. The present embodiment differs from the foregoing second embodiment in that a light emitted from the light source unit 11 is guided to the underside of the light guide plate 3 using an optical fiber 3. FIG. 5 is a rear view showing a schematic structure of a planar illumination device according to the present embodiment.

As shown in FIG. 5, the planar illumination device according to the present embodiment includes a light source unit 11, collimator lenses 16 and 18, an optical fiber 17, a polarization beam splitter 13, linearization optical elements 14a and 14b, prisms 15a and 15b and a light guide plate.

In the planar illumination device according to the present embodiment, light from the light source unit 11 is condensed by the collimator lens 16 to be incident on the optical fiber 17 and light emitted from the optical fiber 17 is formed into substantially parallel light by the collimator lens 18 to be incident on the polarization beam splitter 13. Since the light directed through the optical fiber 17 loses its polarized nature while being guided by the optical fiber 17, it is polarized and split into transmission light and reflected light substantially at 1:1 by the polarization beam splitter 13.

Fourth Embodiment

Figure 6:
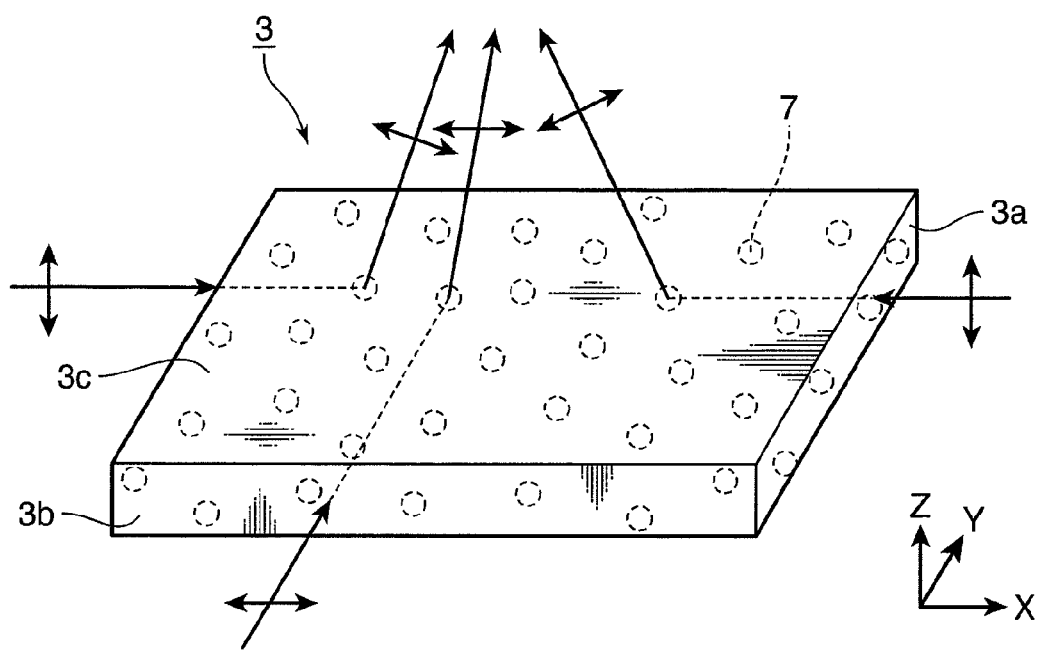
FIG. 6 is a diagram showing polarized lights of incident lights and output lights on and from a light guide plate used in a planar illumination device according to the fourth embodiment of the invention.

Next, the fourth embodiment of the present invention is described. In the foregoing first to third embodiments, lights emitted from the light source unit are entered through two light incident surfaces of the light guide plate, which are provided to be orthogonal to one another. In contrast, lights emitted from a light source unit are incident through three light incident surfaces of the light guide plate in the present embodiment. FIG. 6 is a typical depiction showing polarized lights of incident lights on and output lights from a light guide plate used in a planar illumination device according to the present embodiment. The basic structures of the present invention are the same as those of the first through third embodiments, and explanations thereof shall be omitted here.

In FIG. 6, lights entered through the light incident surface 3a and a surface facing the light incident surface 3a are Z-direction polarized lights, and lights entered through the light incident surface 3b are polarized in the X-direction. Accordingly, in the present embodiment, the lights entered through the light incident surface 3a and the surface facing the light incident surface 3a are outputted as lights having polarization planes in an XZ plane, whereas the X-direction polarized light entered through the light incident surface 3b are outputted as X-direction polarized light. As a result, the output lights of more uniform luminance can be realized.

In the present embodiment, it is possible to realize still more uniform luminance of the output lights by arranging such that lights are entered also through the surface facing the light incident surface 3b. In this case, it may be arranged so as to enter the X-direction polarized lights through the surface facing the light incident surface 3b and to output the X-direction polarized lights.

The effect of improving the light utilization efficiency can be achieved also from the foregoing structure of illuminating in three or four directions as in the case of illuminating in two directions. In this case, it may be arranged such that the lights entered through the surface facing the light incident surface 3a have a polarization plane in the XZ-plane and lights entered through the surface facing the light incident surface 3b become X-direction polarized light, so that output lights thereof can pass through the polarizing plate 65 on the incident side of the liquid crystal display panel. As described, with the arrangement wherein the lights are entered through a plurality of end surfaces (light incident surfaces) of the light guide plate, it is possible to realize a still more uniform luminance.

Incidentally, the present embodiment may be arranged such that red, blue and green lights are respectively entered through different light incident surfaces. For example, in the case of using SHG as a green light source, only the green light source has a large size. It is therefore possible to increase the degree of freedom in arrangement by providing a separate light incident surface for the green light. Furthermore, in the case of adopting a screen with difference in length between vertical and horizontal dimensions, such as 16:9, for example, the problem of non-uniformity in color due to differences in absorption in the light guide plate is incident only from the vertical direction.

Fifth Embodiment

Next, the fifth embodiment of the present invention is described. In the present embodiment, a polarization hologram layer is arranged at a reflecting surface side of the light guide plate according to any one of the foregoing first to fourth embodiments. Other than the foregoing, the structure of the present invention is the same as those of the first to fourth embodiments, and explanations thereof shall be omitted here. FIG. 7 is a cross-sectional view showing the schematic structure of the light guide plate used in the planar illumination device according to the present embodiment.

In the present embodiment, the lights entered into the light guide plate 3 are gradually emitted from the light output surface by being polarized by scattering elements 7 while being repetitively reflected between one principal surface (light output surface) and the other principal surface (reflecting surface) of the light guide plate 3. The present embodiment is the same as the foregoing first to fourth embodiments in this point; however, the characteristic feature of the present embodiment lies in that the light guide plate 3 of the present embodiment particularly includes a polarization hologram layer 32 formed on a reflecting layer 33 on the reflecting surface side of the light guide plate 3 as shown in FIG. 7.

The polarization hologram layer 32 of the present embodiment is provided for changing the polarized state of light propagating in the light guide plate 3 to set the polarization direction of the light in the X-direction, i.e., the same direction as a transmission axis of a polarizing plate 65 of the liquid crystal display panel 6. With this structure, the polarizations of lights output from the light guide plate 3 can be more aligned, thereby realizing a still higher transmission efficiency of the liquid crystal display panel 6.

In the foregoing embodiment, the polarization hologram layer 32 is provided on the reflecting surface side of the light guide plate 3. However, the present invention is not intended to be limited to the foregoing structure, and the polarization hologram layer may be formed on the light output surface side of the light guide plate 3 or both on the reflecting surface and the light output surface.

Sixth Embodiment

Figure 8A:
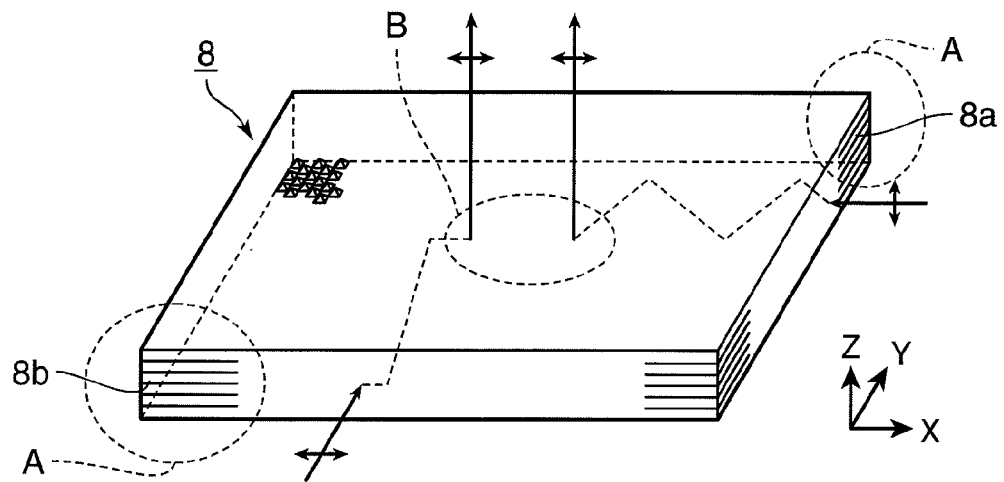
FIG. 8A is a perspective view showing a schematic structure of a light guide plate used in a planar illumination device according to the sixth embodiment of the invention.
Figure 8B:
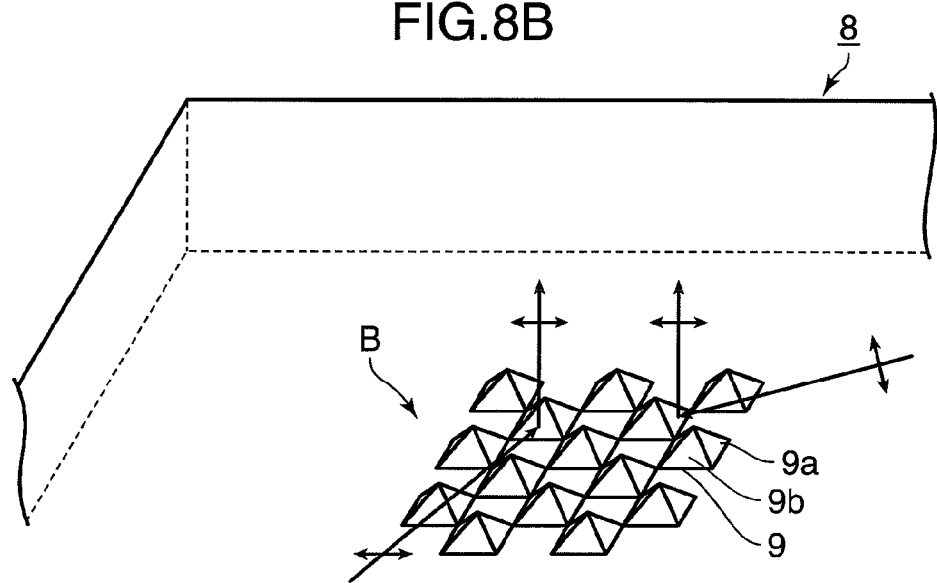
FIG. 8B is an enlarged plan view of a part B of FIG. 8A

Next, the sixth embodiment of the present invention is described. In the present embodiment, a plurality of deflectors having a fine convexo-concave structure is formed on a reflecting surface in replace of the scattering elements formed in the light guide plates of the foregoing first to fourth embodiments. Explanations on other structures of the present invention which are in common with the foregoing first to fourth embodiments shall be omitted here. FIG. 8A is a perspective view showing a schematic structure of the light guide plate used in the planar illumination device according to the present embodiment, FIG. 8B is an enlarged plan view of a part B of FIG. 8A, and FIG. 8C is an enlarged section of a part A of FIG. 8A.

Figure 8C:
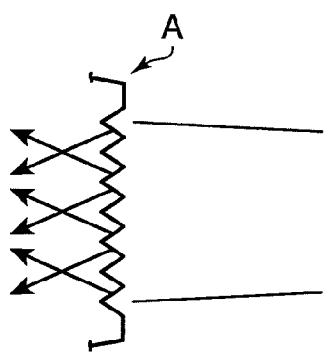
FIG. 8C is an enlarged section of a part A of FIG. 8A.

In a light guide plate 8 of the present embodiment, as shown in FIGS. 8A and 8C, convexo-concave structures for diffracting, refracting or scattering incident lights in a thickness direction (Z-direction in FIG. 8) of the light guide plate 8 are formed on light incident surfaces 8a and 8b, on which lights from light sources are incident. On the other hand, a plurality of deflectors 9 having a fine convexo-concave structure for changing propagation directions of lights incident on the light guide plate 8 by an optical phenomenon such as reflection, scattering, refraction or diffraction are formed on the surface (reflecting surface) facing the output surface of the light guide plate 8 as shown in FIG. 8B. Each deflector 9 is formed to have a reflecting surface whose normal lies in the XZ plane or YZ plane and deflects light incident on the light guide plate 8 to direct it toward the light output surface. The deflectors 9 may be formed by grooves formed in the reflecting surface of the light guide plate 8 by laser processing or grooves integrally formed simultaneously with the molding of the light guide plate 8.

In the planar illumination device according to the present embodiment, for example, lights emitted from the linear light source units 1a and 1b of FIG. 1 are entered into the light guide plate 8, wherein the Z-polarized light is entered through the light incident surface 8a and the X-polarized light is entered through the light incident surface 8b. The light entered through the light incident surface 8a is scattered in the Z-direction by the convexo-concave structure of the light incident surface 8a and deflected by reflecting surfaces 9a, whose normal lie in XZ planes, of the deflectors 9 arranged on the reflecting surface to be emitted from the light output surface as X-direction polarized light.

Similarly, the light entered through the light incident surface 8b is scattered in the Z-direction by the convexo-concave structure of the light incident surface 8b and deflected by reflecting surfaces 9b, whose normals lie in the YZ-planes, of the deflectors 9 arranged on the reflecting surface to be emitted from the light output surface as the X-direction polarized light.

The light outputted from the light guide plate 8 is incident on the liquid crystal display panel 6 after having an output angle distribution corrected by a prism sheet, and most of this light passes through a polarizing plate 65 provided on the incident side so as to have a transmission axis in the X-direction.

According to the light guide plate of the present embodiment, the transmission efficiency of the liquid crystal display panel can be improved by aligning the polarizations of lights emitted from the planar illumination device and a liquid crystal display device with low power consumption can be realized.

Incidentally, the structure wherein the lights are incident on the light guide plate from a plurality of directions is the same as those of the foregoing first to fourth embodiments, and an improved image quality can be realized by making the luminance uniform.

Seventh Embodiment

Figure 9:
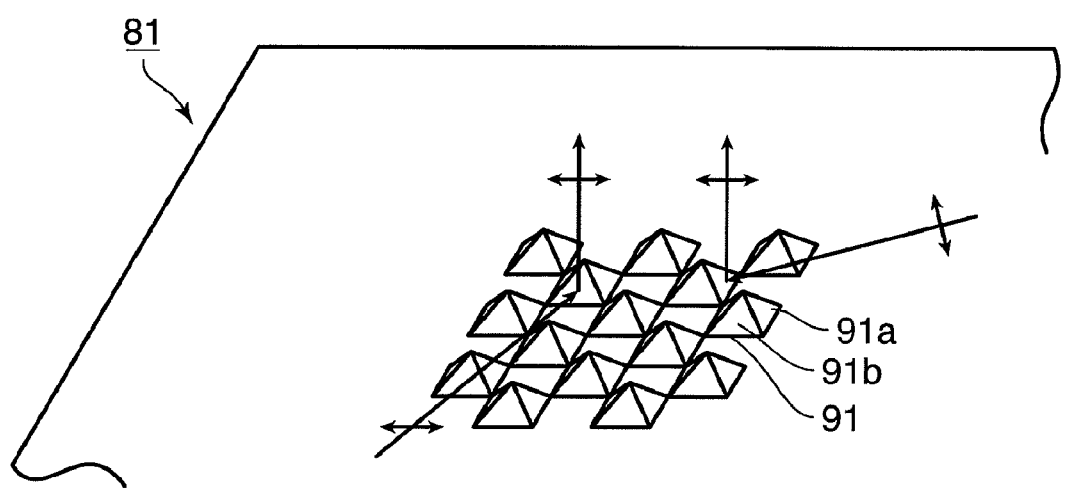
FIG. 9 is a perspective view showing a schematic structure of a reflecting plate used in a planar illumination device according to the seventh embodiment of the invention.

Next, the seventh embodiment of the present invention is described. In the present embodiment, a reflecting plate is provided in replace of the light guide plate of the foregoing sixth embodiment. Explanations on other structures of the present invention which are in common with the foregoing sixth embodiment shall be omitted here. FIG. 9 is a perspective view showing a schematic structure of a reflecting plate used in a planar illumination device according to the present embodiment.

As shown in FIG. 9, a plurality of deflectors 91 having a fine convexo-concave structure for changing propagation directions of lights incident from light sources by an optical phenomenon such as reflection, scattering, refraction or diffraction are arranged on a reflecting surface 81 of the present embodiment.

In the planar illumination device according to the present embodiment, for example, lights from the linear light source units 1a and 1b are directed to the light guide plate 81, wherein the Z-polarized light is incident from the linear light source unit 1a and the X-polarized light is incident from the linear light source unit 1b. The light incident from the linear light source unit 1a is deflected by reflecting surfaces 91a, whose normals lie in the XZ-planes, of the deflectors 91 arranged on the reflecting surface 81 to be outputted to the liquid crystal display panel 6 as the X-direction polarized light while propagating in the air on the side of the liquid crystal display panel 6 of the reflecting plate.

Similarly, the light incident from the linear light source unit 1b is deflected by reflecting surfaces 91b, whose normals lie in the YZ-planes, of the deflectors 91 arranged on the reflecting surface 81 to be outputted to the liquid crystal display panel 6 as the light polarized in the X-direction light while propagating in the air on the side of the reflecting surface 81 toward the liquid crystal display panel 6.

By adopting the reflecting plate 81 of the present embodiment, the transmission efficiency of the liquid crystal display panel can be improved by aligning the polarizations of lights emitted from the planar illumination device and a liquid crystal display device with low power consumption can be realized similar to the foregoing sixth embodiment. Furthermore, higher image quality can be promoted by making the luminance uniform.

According to the planar illumination devices and the liquid crystal display devices using the same according to the first to seventh embodiments of the present invention, it is possible to realize wide color reproducibility and thin large screens by adopting laser light sources, which provides high color purity, and which is suited for a high power output. It is also possible to realize large effects of improving image quality resulting from more uniform luminance, and reducing power consumption resulting from an improved utilization efficiency of light.

Eighth Embodiment

Figure 10A:
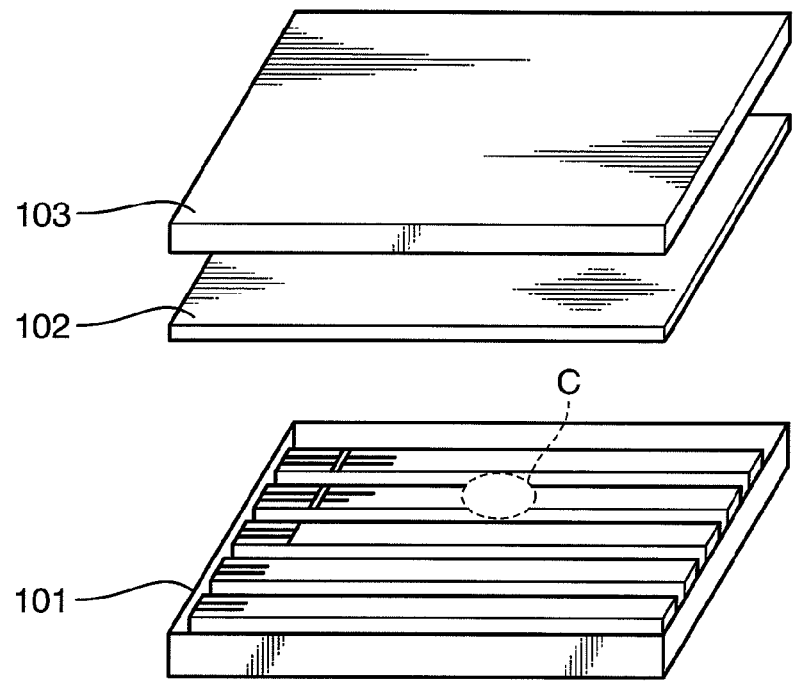
FIG. 10A is a perspective view showing a schematic structure of a display unit of a liquid crystal display device according to an eighth embodiment of the invention and FIG. 10B is an enlarged perspective view of a part C of FIG. 10A.
Figure 10B:
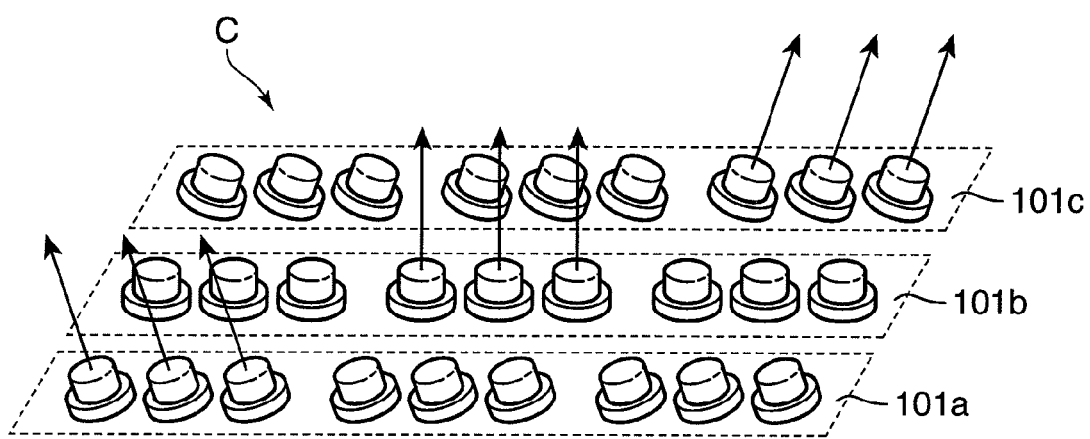

Next, the eighth embodiment of the present invention is described. FIG. 10A is a perspective view showing a schematic structure of a display unit of a liquid crystal display device according to the eighth embodiment of the invention and FIG. 10B is an enlarged perspective view of a part C of FIG. 10A.

As shown in FIG. 10A, the display unit of the liquid crystal display device according to the present embodiment includes: a direct illumination type backlight 101 in which LED devices of three primary colors for emitting red, blue and green lights are arranged in a planar manner, a diffusing plate 102 and a liquid crystal display panel 103. As shown in FIG. 10B, the backlight 101 includes light source units 101a, 101b and 101c in each of which the LED devices are arranged.

According to the backlight 101 of the present embodiment, the LED devices of the light source unit 101a are inclined so as to emit lights to the left hand side, the LED devices of the light source unit 101c are inclined so as to emit lights to the right hand side, and the LED devices of the light source unit 101b are arranged so as to emit lights to be front side.

Figure 11A:
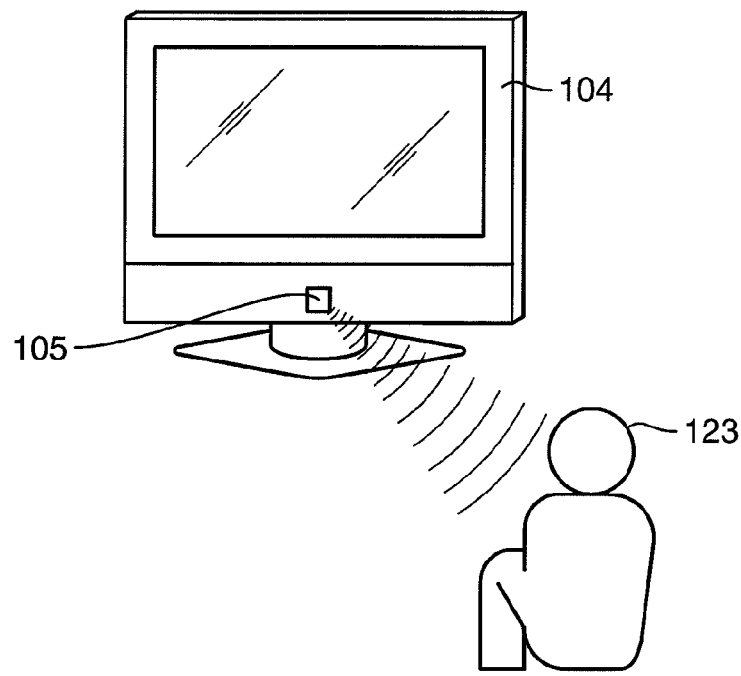
FIG. 11A is a front view showing the outer appearance of a liquid crystal display device provided with the display unit of FIG. 10A.
Figure 11B:
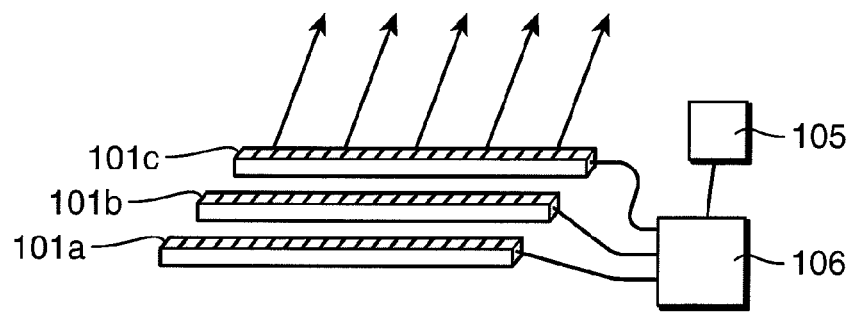
FIG. 11B is a diagram showing a connection relationship of a human detection sensor, light source units of a backlight and a controller
Figure 11C:
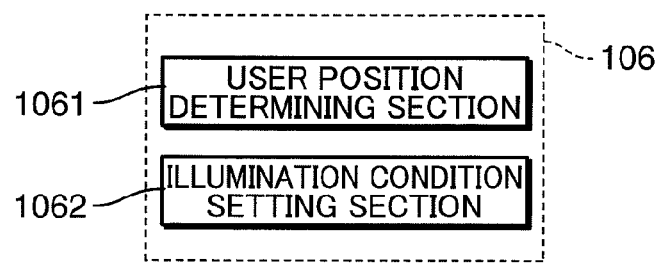
FIG. 11C is a block diagram showing a schematic structure of the controller of FIG. 11B.

With reference to FIGS. 11A to 11C, a basic operation of the liquid crystal display device according to the present embodiment is described below. FIG. 11A is a front view showing the outer appearance of a liquid crystal display device 104 according to the present embodiment. FIG. 11B is a typical depiction showing a connection relationship of a human detection sensor 105 of FIG. 11A, the light source units 101a, 101b and 101c of the backlight 101 and a controller 106 for controlling the respective light source units 101a, 101b and 101c. FIG. 11C is a block diagram showing a schematic structure of the controller 106 of FIG. 11B.

As shown in FIG. 11A, the liquid crystal display device 104 according to the present embodiment is provided with the human detection sensor 105 for detecting the position of a user 123 watching videos displayed on the liquid crystal display panel 103 of the display unit of the liquid crystal display device 104. The human detection sensor 105 utilizes, for example, electromagnetic waves for the position detection of the user 123. Electromagnetic waves generated from the human detection sensor 105 may be reflected from the user 123 and then the reflected electromagnetic waves may be detected by the human detection sensor 105.

As shown in FIG. 11B, the light source units 101a, 101b and 101c according to the present embodiment are controlled by the controller 106 connected to the human detection sensor 105. The controller 106 includes a user position determining section 1061 and an illumination condition setting section 1062 as shown in FIG. 11C. The user position determining section 1061 obtains position indicative information of the user 123 detected by the human detection sensor 105 and determines a positional relationship of the liquid crystal display device 104 and the user 123 based on the position indicative information. The illumination condition setting section 1062 sets illumination conditions of the light source units 101a, 101b and 101c based on the determination result of the user position determining section 1061. Here, the illumination condition setting sections 1062 sets respective amounts of lights to be emitted from the light source units 101a, 101b and 101c for illumination conditions, and the light in an amount as set for each of the illumination conditions is emitted from each of these light source units 101a, 101b and 101c.

In the liquid crystal display device 104 according to the present embodiment, lights emitted from the respective light source units 101a, 101b and 101c of the backlight 1 have transmittances of the respective colors of red, blue and green controlled in the liquid crystal display panel 103 after being diffused by the diffusing plate 102, and an image is color displayed on the front surface of the liquid crystal display panel 103.

Here, the luminance of an image displayed on the liquid crystal panel 103 varies according to a viewing angle of the user 123 (hereinafter referred to as "viewing angle characteristic"). Normally, the luminance is highest when viewed from the front face, and the luminance becomes lower as the viewing angle is displaced from the front face. However, since the LED devices are inclined in the light source units 101a and 101c of the present embodiment, the viewing angle characteristic of only lights emitted from the light source unit 101a has a skewed luminance distribution to the left from the front of the screen, and lights emitted only from the light source unit 101c have a viewing angle characteristic with a distribution opposite to that of the lights emitted from the light source unit 101a.

Next, an operation of controlling an amount of light by the controller 106 is described. The user 123 shown in FIG. 11A is located more to the right side with respect to the front side of the screen of the liquid crystal display device 104. Firstly, the human detection sensor 105 detects the user 123 positioned more to the right with respect to the front side of the screen of the liquid crystal display device 104 and transmits this information to the controller 106. Based on this information, the user position determining section 1061 determines that the user 123 is positioned more to the right with respect to the front side of the screen of the liquid crystal display device 104 and sends the result of determination to the illumination condition setting section 1062. The illumination condition setting section 1062 sets the emission amounts of the respective light source units 111a, 101b and 101c such that the amount of light emitted from the light source unit 101c is larger than those of the light source units 101a and 101b. Specifically, the illumination condition setting section 1062 sets the respective illumination conditions to increase the amount of light emitted from the light source unit 101c and to decrease the amounts of lights emitted from the light source units 101a and 101b. With the foregoing light amount control by the controller 106, the luminance at a line-of-sight angle from the right side of the screen increases to increase visibility for the user 123 and luminance at other angles decrease to reduce power consumption.

According to the liquid crystal display device of the present embodiment, the position of the user 123 is detected and the luminance is controlled to increase in that direction, and the visibility is improved and the power consumption is reduced by decreasing the luminance in other directions.

Generally, differences in viewing angle characteristics among the respective colors if any, cause a problem in that color changes according to viewing angles. In response, the present embodiment has a desirable structure wherein fine adjustments can be made on the amounts of lights in respective colors emitted at a plurality of output angles, thereby displaying a quality image with a wide viewing angle while reducing variations in color.

In the present embodiment, the position of the user 123 is detected by the human detection sensor 105. However, the present embodiment is not intended to be limited to this, and, for example, the user 123 may set his position using a remote controller or the like.

In the present embodiment, the viewing angle characteristic of the backlight 101 is controlled according to the direction toward the user 123. However, the present embodiment is not intended to be limited to this, and for example, the luminance of the backlight 101 may be adjusted as well according to distance between the user 123 and the liquid crystal display device 104. For example, when the user 123 is positioned in a vicinity of the liquid crystal display device 104, a reduction in power consumption can be realized by reducing the luminance in the direction toward the user 123.

In the case where a plurality of users are present around the liquid crystal display device, power saving can be promoted by controlling the viewing angles in accordance with the positions of the users. Furthermore, by detecting the position of the user 123 in a predetermined cycle, a light amount control in conformity with the movement of the user 123 can be realized.

Ninth Embodiment

Figure 12A:
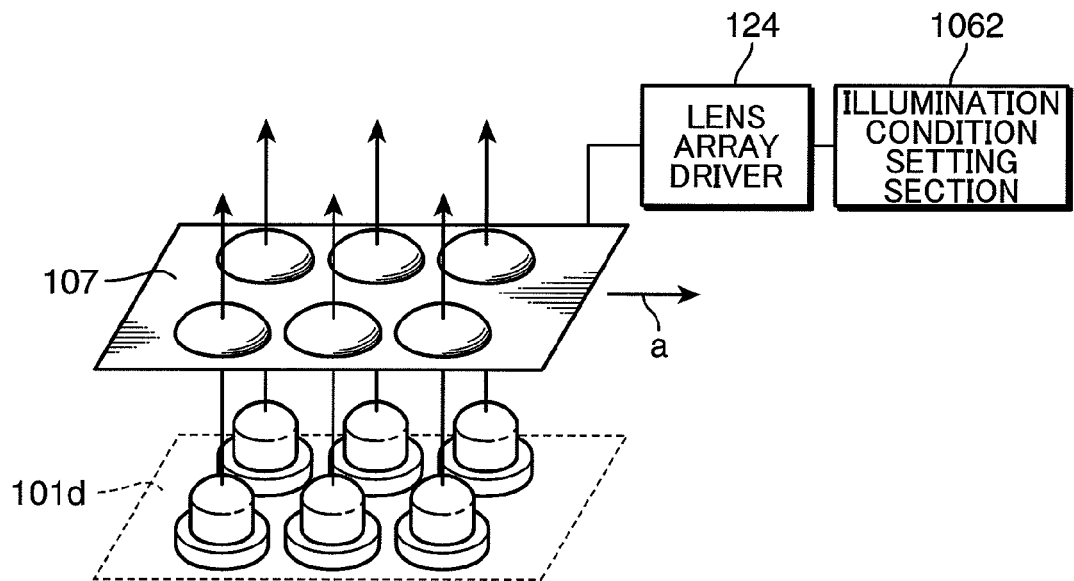
FIGS. 12A and 12B are enlarged perspective views of a light source unit of a backlight used in a liquid crystal display device according to a ninth embodiment of the invention.
Figure 12B:
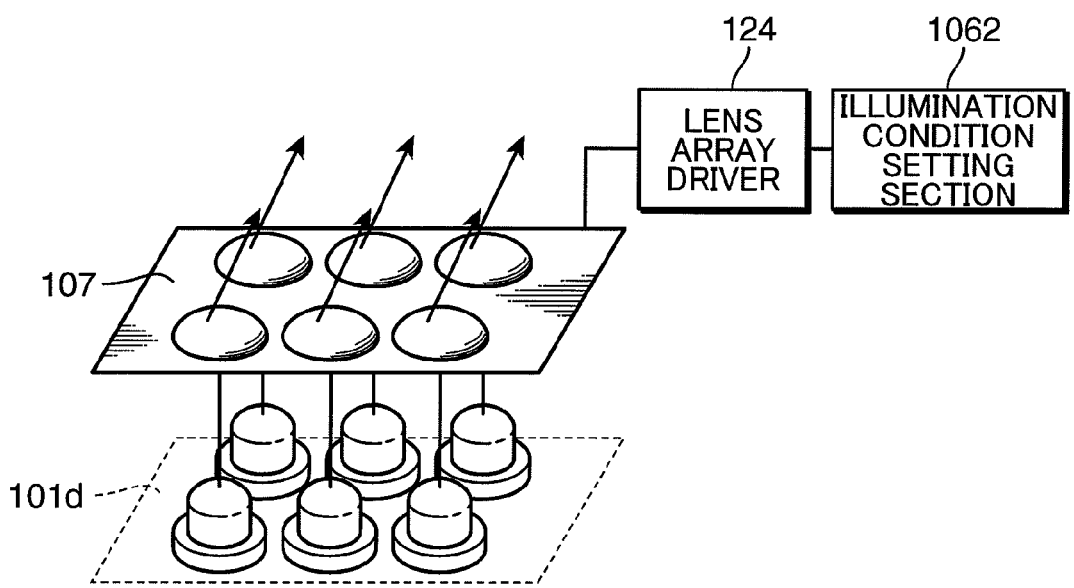

Next, the ninth embodiment of the present invention is described. The characteristic structure of the present embodiment lies in the backlight 101 of the foregoing eighth embodiment, which will be explained below. Explanations on other structures of the present invention which are in common with the foregoing eighth embodiment shall be omitted here. FIGS. 12A and 12B are enlarged perspective views of a light source unit of a backlight used in a liquid crystal display device according to the present embodiment.

As shown in FIG. 12A, the backlight of the present embodiment is arranged such that a light source unit 101*d* made up of LED devices arranged in a planar manner emits lights to the front face, and a lens array 107 corresponding to the respective LED devices is provided. The position of the lens array 107 is controlled on a plane.

Specifically, the position of the lens array 107 is controlled by a lens array driver 124 for moving the lens array 107. This lens array driver 124 moves the lens array 107 in accordance with an illumination condition as set by an illumination condition setting section 1062.

Here, FIG. 12A shows a case where lights are emitted toward the front side of the light source unit 101*d* and FIG. 12B shows a case where lights are emitted toward the right side of the light source unit 101*d*. In FIG. 12B, emission directions of the lights are changed by displacing the lens array 107 in a direction of "a" from the position of FIG. 12A. According to the foregoing structure, it is possible to make a fine adjustment of the emission direction, thereby realizing the effects as achieved from the foregoing eighth embodiment.

According to the foregoing structure, the viewing angle can be adjusted by moving the lens array 107 in an optical axis direction.

Furthermore, according to the present embodiment, both a light source unit with a fixed emission direction and a light source unit with a variable emission direction may be used as the light source units of the backlight.

Tenth Embodiment

Figure 13:
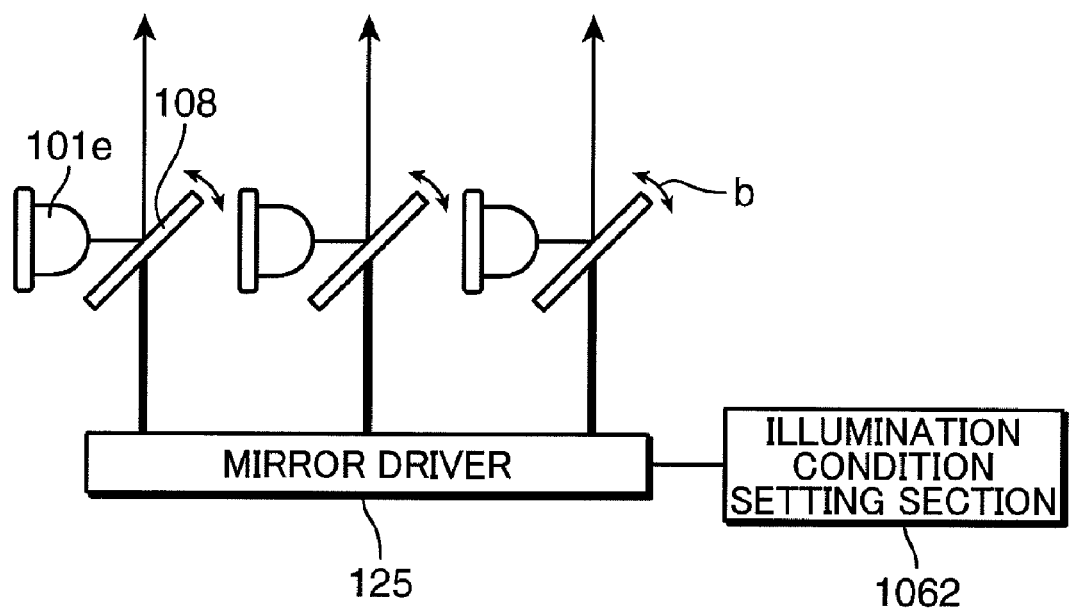
FIG. 13 is an enlarged side view of light source units of a backlight used in a liquid crystal display device according to the tenth embodiment of the invention.

Next, the tenth embodiment of the present invention is described. The present embodiment also has the characteristic structure in the backlight 101 of the foregoing eighth embodiment. Explanations on other structures of the present invention which are in common with the foregoing eighth embodiment shall be omitted here. FIG. 13 is an enlarged side view of a light source unit of a backlight used in a liquid crystal display device according to the present embodiment.

As shown in FIG. 13, the backlight of the present embodiment is arranged such that lights emitted from a light source unit 101*e* are reflected from mirrors 108, and emission directions are controlled by changing the angles of the mirrors 108 by rotating the mirrors 108 in directions "b". The rotation of the mirrors 108 is controlled by a mirror driver 125 for rotating the mirrors 108, and the mirror driver 125 rotates the mirrors 108 in accordance with an illumination condition set by an illumination condition setting section 1062.

In the present embodiment, both a light source unit with a fixed emission direction and a light source unit with a variable emission direction may be used as the light source units of the backlight.

Eleventh Embodiment

Figure 14:
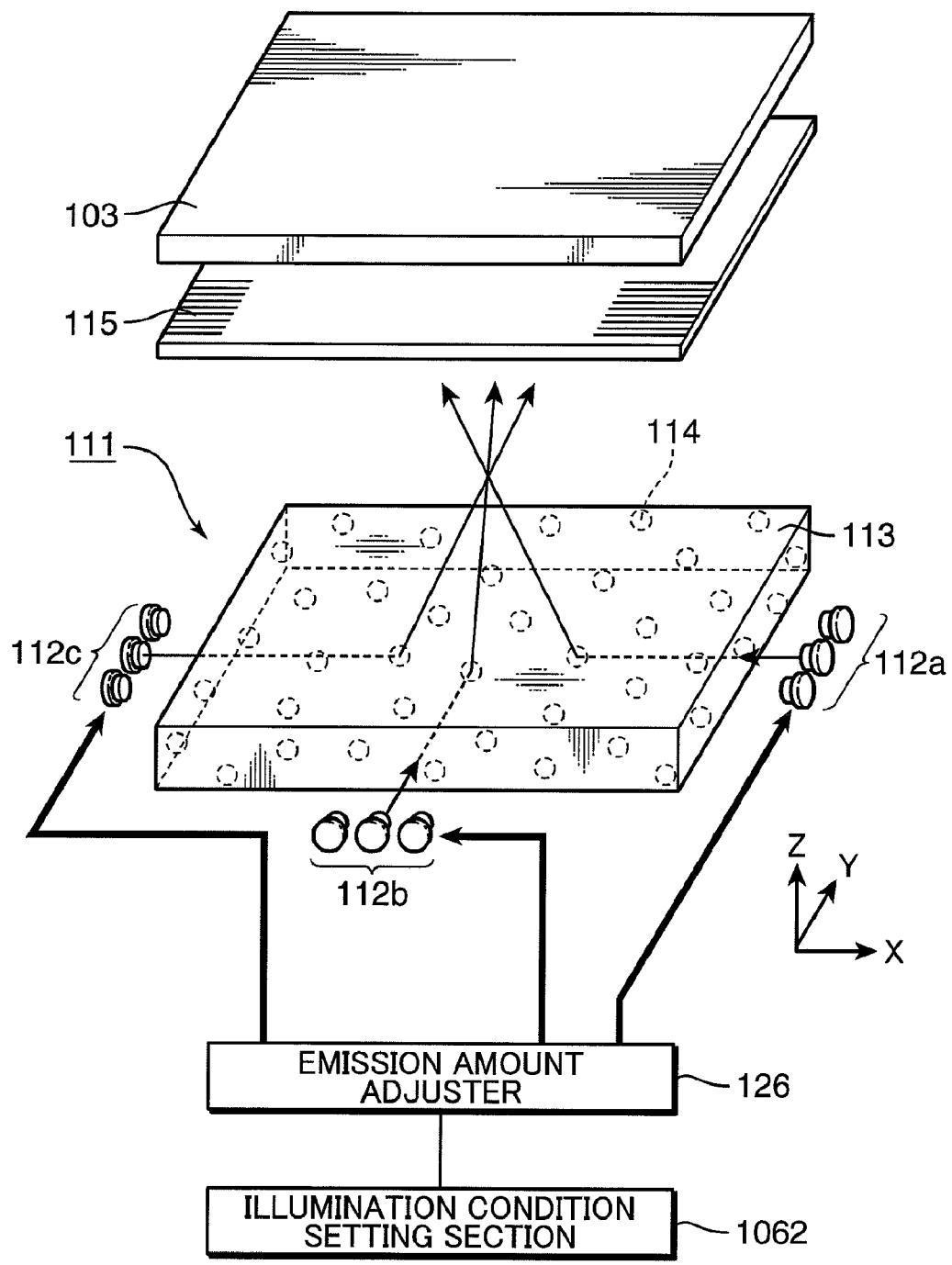
FIG. 14 is a perspective view showing a schematic structure of a display unit of a liquid crystal display device according to the eleventh embodiment of the invention.

Next, the eleventh embodiment of the present invention is described. In the present embodiment, an edge light type backlight is adopted in replace of the direct illumination type backlight of the foregoing eighth embodiment. Explanations on other structures of the present invention which are in common with the above eighth embodiment shall be omitted here. FIG. 14 is a perspective view showing a schematic structure of a display unit of a liquid crystal display device according to the present embodiment.

A display unit of the liquid crystal display device according to the present embodiment is, as shown in FIG. 14, provided with an edge light type backlight 111, a prism sheet 115 and a liquid crystal display panel 103. The backlight 111 includes light source units 112*a*, 112*b* and 112*c* made up of LED devices or laser light sources for emitting lights of three primary colors, i.e. red, green and blue lights, and a light guide plate 113. As in the structure of the first embodiment, a multitude of isotropic scattering elements 114 having no directivity are uniformly arranged in the light guide plate 113, and incident lights from the light source units 112*a*, 112*b* and 112*c* are equally deflected in every direction by an optical phenomenon such as reflection, scattering, refraction or diffraction caused by the multitude of scattering elements 114. The prism sheet 115 is the one for deflecting output angles in the Y-direction of FIG. 14.

Although not shown, the backlight 111 of the present embodiment is installed in a liquid crystal display device similar to that of the above eighth embodiment and is arranged such that amounts of light emitted from the light source units 112*a*, 112*b* and 112*c* can be controlled based on the information from a human detection sensor. Specifically, the backlight 111 of the present embodiment includes an emission amount adjuster 126 for adjusting the amounts of lights respectively emitted from the light source units 112*a*, 112*b* and 112*c*, and the emission amount adjuster 126 adjusts the amounts of lights emitted in accordance with the illumination conditions set by the illumination condition setting section 1062.

In the liquid crystal display device according to the present embodiment, lights emitted from the light source units 112*a*, 112*b* and 112*c* are incident on the light guide plate 113 and deflected by the scattering elements 114 in the light guide plate 113 to be emitted from the light guide plate 113. Here, since the majority of the lights incident on the light guide plate 113 are emitted while being biased in a direction opposite to incident directions, the viewing angle characteristic of light emitted from the light source unit 112*a* has a maximum luminance in a negative direction along an X axis of FIG. 14 and light emitted from the light source unit 112*c* is opposite to the light emitted from the light source unit 112*a*. Furthermore, the light emitted from the light source unit 112*b* has a viewing angle characteristic biased in the Y direction of FIG. 14; however, comes to have a viewing angle characteristic with a maximum luminance to the front side of the backlight by having an output angle thereof deflected by the prism sheet 115.

The lights emitted from the light source units 112*a* and 112*c* and passed through the prism sheet 115 and the light from the light source unit 112b deflected by the prism sheet 115 have the transmittances of the respective colors of red, blue and green controlled in the liquid crystal display panel 103, thereby displaying a color image on the front surface of the liquid crystal display panel 103.

Here, in the case where a user is positioned, for example, more to the right (positive direction of an X axis of FIG. 14) with respect to the front side of the screen of the liquid crystal display panel, the human detection sensor 105 detects the user 123 located more to the right with respect to the front side of the screen of the liquid crystal display device 104 and this information is sent to the controller 106. Subsequently, based on this information, a user position determining section 1061 determines that the user 123 is located more to the right than the front side of the screen of the liquid crystal display device 104 and sends the result of determination to the illumination condition setting section 1062. The illumination condition setting section 1062 sets the respective emission quantities of the light source units 112a, 112b and 112c such that the amount of lights emitted from the light source unit 112c is larger than those of the light source units 112a and 112b. Specifically, the illumination condition setting section 1062 sets the respective illumination conditions to increase the amount of light emitted from the light source unit 112c and to decrease the amounts of lights emitted from the light source units 112a and 112b. The emission amount adjuster 126 adjusts the respective amounts of lights emitted from the light source units 112a and 112b in accordance with the illumination conditions set by the illumination condition setting section 1062. With the foregoing emission amount control of the emission amount adjuster 126, the luminance at a line-of-sight angle from the right side of the screen increases to increase visibility for the user 123 and luminances at other angles decrease, thereby suppressing power consumption.

Also in the liquid crystal display device of the present embodiment, the position of the user is detected and the luminance is controlled to increase in that direction, and visibility is improved and power consumption is reduced by decreasing luminance in other directions.

When using a laser light source as a light source, the effect of increasing the luminance in a necessary direction and decreasing it in an unwanted direction is further improved since the directivity is higher as compared with the case of LED devices. In this case, if the directivity of laser lights in the light guide plate 113 is too high, the range of an output angle of light emitted from the light guide plate 113 can be widened to obtain the output light with a suitable degree of scattering by providing a convexo-concave structure for diffracting, refracting or scattering light in a thickness direction on the light incident surface of the light guide plate 113.

Twelfth Embodiment

Figure 15A:
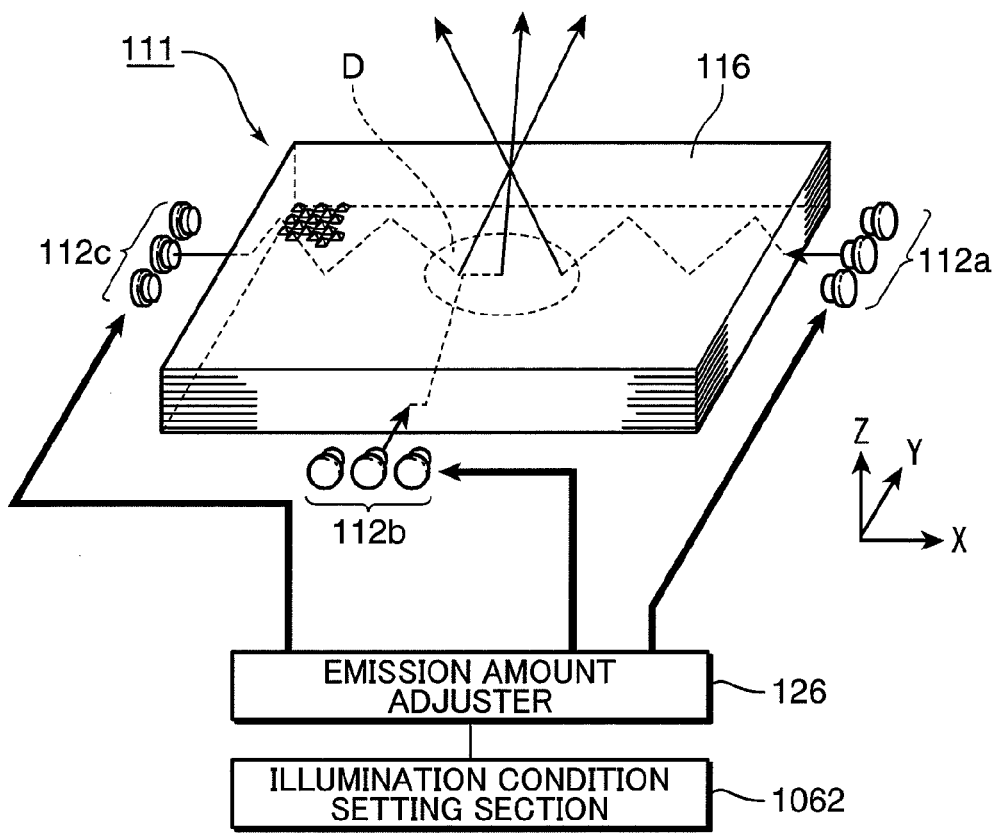
FIG. 15A is a perspective view showing a schematic structure of a light guide plate of a backlight used in a liquid crystal display device according to the twelfth embodiment of the invention and FIG. 15B is an enlarged plan view of a part D of FIG. 15A.

Next, the twelfth embodiment of the present invention is described. In the present embodiment, a plurality of deflectors having a fine convexo-concave structure are arranged on the reflecting surface in replace of the scattering elements provided in the light guide plate of the foregoing eleventh embodiment. Explanations on other structures of the present invention which are in common with the foregoing eleventh embodiment shall be omitted here. FIG. 15A is a perspective view showing the schematic structure of a light guide plate used in a liquid crystal display device according to the present embodiment and FIG. 15B is an enlarged plan view of a part D of FIG. 15A.

Figure 15B:
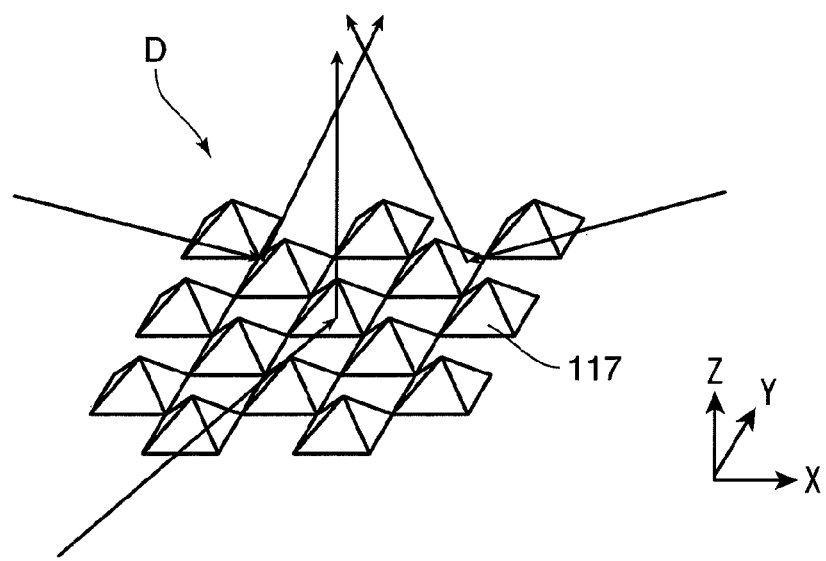

As shown in FIGS. 15A and 15B, a plurality of deflectors 117 having such a fine convexo-concave structure for deflecting and emitting lights incident through different end surfaces in different directions are arranged on a surface (reflecting surface) facing a light output surface in a light guide plate 116 of the present embodiment.

In the liquid crystal display device according to the present embodiment, light source units 112a, 112b and 112c are semiconductor laser devices and lights with high directivity are incident while being suitably diffused by the convexo-concave structures of the respective light incident surfaces of the light guide plate 116. Each deflector 117 on the reflecting surface of the light guide plate 116 is formed to have a reflecting surface whose normal lies in an XZ plane or YZ plane, and lights incident from the light source units 112a, 112b and 112c are emitted in different directions in the XZ plane. Thus, effects similar to those of the above eleventh embodiment are obtained.

Thirteenth Embodiment

Figure 16A:
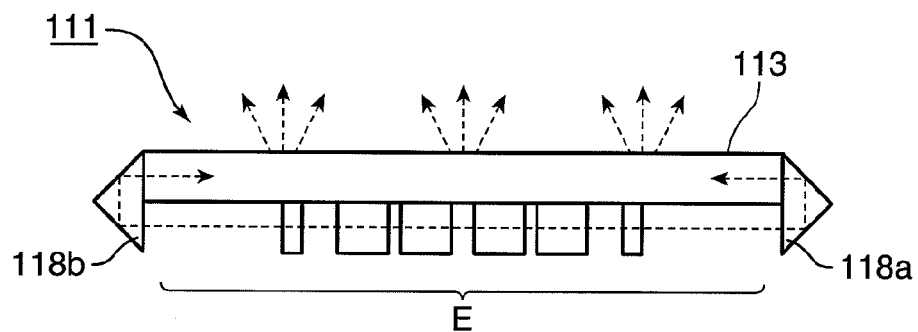
FIG. 16A is a side view showing a schematic structure of a backlight used in a liquid crystal display device according to a thirteenth embodiment of the invention and FIG. 16B is a rear view of the backlight including a part E of FIG. 16A.

Next, the thirteenth embodiment of the present invention is described. In the foregoing eleventh and twelfth embodiments, the light source units are provided in the outside of the light guide plate. In contrast, in the present embodiment, light source units are provided on the underside of a light guide plate and lights are incident on the light guide plate while being deflected by mirrors or the like. FIG. 16A is a side view showing a schematic structure of a backlight 111 according to the present embodiment and FIG. 16B is a rear view of the backlight including a part E of FIG. 16A.

Figure 16B:
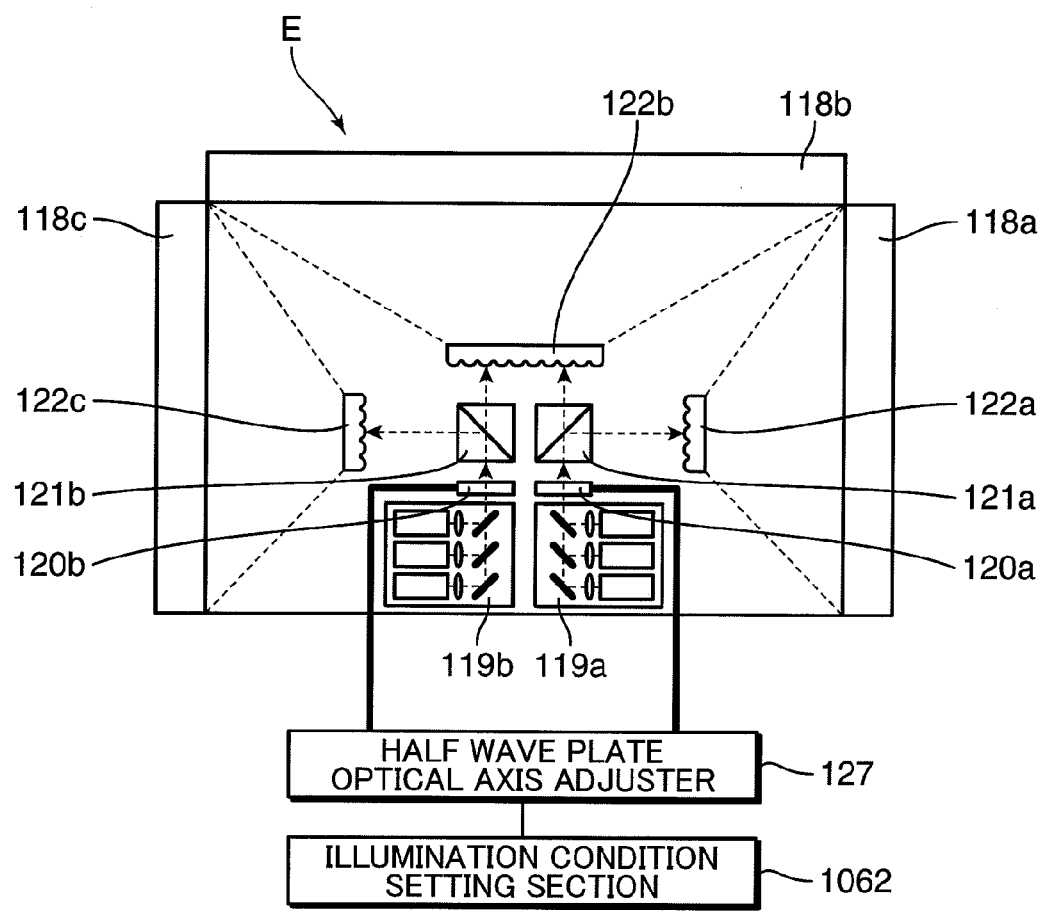

The backlight 111 of the present embodiment is, as shown in FIGS. 16A and 16b, provided with a light guide plate 113, two light source units 119a and 119b arranged on the underside of the light guide plate 113 for combining and emitting lights with aligned polarizations from laser light sources of three primary colors, prisms 118a, 118b and 118c for introducing lights from the light source units 119a and 119b on the underside of the light guide plate 113 to end surfaces of the light guide plate 113, half wave plates 120a and 120b for rotating the polarizations of the lights from the light source units 119a and 119b, polarization beam splitters 121a and 121b, and linearization optical elements 122a, 122b and 122c which are lenticular lenses, cylindrical lenses or the like. The orientations of the optical axes of the half wave plates 120a and 120b are controlled by a half wave plate optical axis adjuster 127, so that the polarizations of the lights from the light source units 119a and 119b can be controlled. The half wave plate optical axis adjuster 127 changes the orientations of the optical axes of the half wave plates 120a and 120b in accordance with illumination conditions set by an illumination condition setting section 1062.

Since the polarizations of lights emitted from the light source units 119a and 119b can be freely changed by the two wave plates 120a and 120b in the backlight 111 of the present embodiment, ratios of lights passing through and reflected from the polarization beam splitters 121a and 121b can be controlled.

According to the foregoing structure, lights incident on the light guide plate 113 via the linearization optical elements 122a, 122b and 122c and the prisms 118, 118b and 118c have different output angles depending on the end surfaces on which they are incident, and amounts of light thereof can be controlled individually. As a result, the effects as achieved from the foregoing eleventh and twelfth embodiments can be achieved.

According to the liquid crystal display devices of the eighth to the thirteenth embodiments of the present invention, it is possible to obtain a large effect of reducing power consumption by reducing the luminance in unnecessary directions in which the user is not present while ensuring sufficient luminance in a necessary direction by detecting the position of the user.

Furthermore, by suppressing changes in color when the screen is viewed in an oblique direction, a liquid crystal display device with a high viewing angle and high image quality can be realized.

The present invention is summarized as follows from the above respective embodiments. Specifically, a planar illumination device according to one aspect of the present invention for illuminating a liquid crystal display panel provided with a polarizing plate on a light incident side, includes: a light source unit for emitting light having a specified polarization direction; and a light irradiating member for deflecting light emitted from the light source unit and irradiating the liquid crystal display panel with the deflected light, wherein the light irradiating member deflects the light emitted from the light source unit such that the polarization direction of the light emitted from the light source unit substantially coincides with a transmission axis direction of the polarizing plate of the liquid crystal display panel.

According to the foregoing structure of the planar illumination device, the liquid crystal display panel is irradiated with the light emitted from the light source unit in such a manner that the polarization direction thereof is brought into substantially coincide with the transmission axis direction of the liquid crystal display panel. With this structure, the transmission efficiency of the liquid crystal display panel can be improved, thereby realizing improved light utilization efficiency while reducing power consumption.

It is preferable that the light source unit includes either a first light source for emitting light having a polarization direction substantially orthogonal to a surface of the polarizing plate to be incident on the light irradiating member in the transmission axis direction of the polarizing plate or a second light source for emitting light having a polarization direction substantially parallel to the surface of the polarizing plate to be incident on the light irradiating member in a direction orthogonal to the transmission axis direction of the polarizing plate. It is also preferable that the light source includes the first light source and the second light source; and lights from the first and second light sources are incident on the light irradiating member in directions orthogonal to each other.

According to the foregoing structure, the polarization directions of the respective lights emitted from the first and second light sources can be brought into substantially coincide with the transmission axis direction of the polarizing plate of the liquid crystal display panel.

With the foregoing structure, it is preferable that the light irradiating member be a light guide plate having a first end surface substantially vertical to a transmission axis of the polarizing plate, a second end surface orthogonal to the first end surface, a first principal surface from which incident lights through the first and second end surfaces are emitted, and a second principal surface facing the first principal surface.

According to the foregoing structure, the lights emitted from the first and second light sources can be incident through the two orthogonal end surfaces and the liquid crystal display panel can be irradiated with the respective emitted lights having the polarization directions thereof brought into substantially coincide with the transmission axis direction of the liquid crystal display panel. It is therefore possible to realize a uniform luminance of a liquid crystal display panel with a large area and to display an image of an improved quality.

The light guide plate preferably includes therein a plurality of isotropic scattering elements for deflecting the respective lights emitted from the first and second light sources.

According to the foregoing structure, the respective lights emitted from the first and second light sources can be equally scattered in every direction within the light guide plate. It is therefore possible to direct the respective lights emitted from the first and second light sources respectively to the first principal surface at substantially the same efficiency.

It is preferable that the plurality of scattering elements be formed within the light guide plate at uniform intensities.

According to the foregoing structure, the scattering elements are distributed within the light guide plate at uniform density. It is therefore possible to direct the respective lights emitted from the first and second light sources respectively to the first principal surface at the same efficiency.

It is preferable that a plurality of fine members for deflecting the respective lights emitted from the first and second light sources in directions toward the first principal surface are formed on the second principal surface of the light guide plate; each of the plurality of fine members has a first reflecting surface having a normal in a virtual plane vertical to the first principal surface and orthogonal to the first end surface and a second reflecting surface having a normal in a virtual plane vertical to the first principal surface and orthogonal to the second end surface; and the first and second reflecting surfaces reflect the lights respectively emitted from the first and second light sources toward the first principal surface.

According to the foregoing structure, since the respective lights emitted from the first and second light sources are reflected from the first and second reflecting surfaces toward the first principal surface. It is therefore possible to make the efficiency of directing the light emitted from the first light source to the first principle surface more equal to the efficiency of directing the light emitted from the second light source to the first principle surface.

It is preferable that the plurality of fine members have the same shape and are periodically formed on the second principal surface.

According to the foregoing structure, the plurality of fine members in the same shape are periodically distributed on the second principal surface. It is therefore possible to make it closer to one another the respective efficiencies of directing the light emitted from the first light source to the first principle surface and directing the light emitted from the second light source to the first principle surface.

It is preferable that the light guide plate further include a polarization hologram layer arranged on the second principal surface and adapted to align the polarization directions of the respective lights emitted from the first and second light sources so that the polarization directions of the respective lights emitted from the first and second light sources substantially coincide with the transmission axis direction of the liquid crystal display panel.

According to the foregoing structure, the polarization directions of the respective lights emitted from the first and second light sources can be aligned. It is therefore possible to make the polarization directions of the respective lights emitted from the first and second light sources be more approximated to the transmission axis direction of the liquid crystal display panel.

The light irradiating member is preferably the light irradiating member is a reflecting plate having a flat surface provided on a side of the liquid crystal display panel, a first side substantially vertical to the transmission axis direction of the polarizing plate and a second side orthogonal to the first side and adapted to reflect the respective lights emitted from the first and second light sources on the flat surface to be outputted to the side of the liquid crystal display panel.

According to the foregoing structure, it is possible to simplify the structure of the light irradiating member.

It is preferable that a plurality of fine members for deflecting the respective lights emitted from the first and second light sources in directions to the side of the liquid crystal display panel are formed on the flat surface; each of the plurality of fine members has a first reflecting surface having a normal in a virtual plane vertical to the flat surface and orthogonal to the first side and a second reflecting surface having a normal in a virtual plane vertical to the flat surface and orthogonal to the second side; and the first and second reflecting surfaces reflect the lights emitted from the first and second light sources toward the liquid crystal display panel.

According to the foregoing structure, the respective lights emitted from the first and second light sources can be reflected from the first and second reflecting surfaces toward the first principal surface. It is therefore possible to make the polarization directions of the respective lights emitted from the first and second light sources be more approximated to the transmission axis direction of the liquid crystal display panel.

It is preferable that the plurality of fine members have the same shape and periodically formed on the second principal surface.

According to the foregoing structure, the plurality of fine members in the same shape are periodically distributed on the plane on the side of the liquid crystal display panel. It is therefore possible to make it closer to one another the respective efficiencies of directing the light emitted from the first light source to the first principle surface and directing the light emitted from the second light source to the first principle surface.

It is preferable to further include: a half wave plate for rotating the polarization direction of light emitted from the light source unit; and a polarization beam splitter for splitting the light having passed through the half wave plate into first and second polarization components, transmitting light of the first polarization component and reflecting light of the second polarization component, wherein the polarization beam splitter is provided so as to face the second principal surface of the light guide plate and emits either one of the lights of the first and second polarization components as a light emitted from the first light source while emitting the other as a light emitted from the second light source.

According to the foregoing structure, a light emitted from one light source unit can be split into a light emitted from the first light source and a light emitted from the second light source. It is therefore possible to reduce the number of the light source units. Furthermore, the polarization beam splitter for splitting the light emitted from one light source unit is provided so as to face the second principal surface of the light guide plate. It is therefore possible to prevent an increase in size of the device.

It is preferable to further include a lightguide for guiding light emitted from the light source unit; and a polarization beam splitter for splitting the light guided by the light guide into first and second polarization components, transmitting light of the first polarization component and reflecting light of the second polarization component; wherein the polarization beam splitter is provided so as to face the second principal surface of the light guide plate and emits either one of the lights of the first and second polarization components as a light emitted from the first light source while emitting the other as a light emitted from the second light source.

According to the foregoing structure, lights emitted from one light source unit can be split and emitted as the light emitted from the first light source and the light emitted from the second light source. It is therefore possible to emit two lights without increasing the number of the light source unit. Furthermore, the polarization beam splitter for splitting the light emitted from one light source unit is provided so as to face the second principal surface of the light guide plate. It is therefore possible to prevent an increase in size of the device.

It is preferable that either one of the first and second light sources emit a green light; and the other one of the first and second light sources emits red and blue lights.

According to the foregoing structure, even if the size of the light source for emitting green light is larger than that of the light source for emitting red and blue lights, a degree of freedom in arranging the light sources can be increased since an end surface on which the green light is incident is provided independently of an end surface on which the red and blue lights are incident.

It is preferable that either one of the first and second light sources emit a blue light; and the blue light is emitted in a direction substantially parallel to the shorter one of two sides of the first principal surface orthogonal to each other.

According to the foregoing structure, a traveling distance of the blue light in the light guide plate can be made shorter. It is therefore possible to reduce the attenuation of blue light power in the light guide plate.

The light source unit is preferably a laser light source unit.

According to the foregoing structure, the polarized nature of the light emitted from the light source unit can be intensified. It is therefore possible to more approximate the polarization direction of light emitted from the light source unit to the transmission axis direction of the liquid crystal display panel.

The light source unit preferably includes LED devices and a polarizing element for polarizing lights emitted from the LED devices in a predetermined direction.

According to the foregoing structure, the light having a specified polarization direction can be emitted using inexpensive LED devices. It is therefore possible to reduce the cost of the light source unit.

It is preferable to further include a controller for controlling the half wave plate, wherein the controller changes a ratio of the lights of the first and second polarization components split by the polarization beam splitter by rotating the polarization direction of the light emitted from the light source unit using the half wave plate.

According to the foregoing structure, the polarization directions of the lights emitted from the light source unit can be freely changed. It is therefore possible to control the ratio of the lights of the first and second polarization components split by the polarization beam splitter.

A liquid crystal display device according to another aspect of the present invention comprises the above planar illumination device and a liquid crystal display panel to be illuminated by the planar illumination device, wherein a polarization direction of light irradiated from the planar illumination device substantially coincides with a transmission axis of the polarizing plate.

According to the foregoing structure of the liquid crystal display device, the transmission efficiency of the liquid crystal display panel can be increased by irradiating the liquid crystal display panel with the light emitted from the light source unit and having the polarization direction thereof brought into substantially coincide with the transmission axis direction of the liquid crystal display panel. It is therefore possible to realize a liquid crystal display device with high light utilization efficiency and low power consumption.

It is preferable to further include a sensor for detecting the position of a user viewing an image displayed on the liquid crystal display panel and an adjuster for adjusting an amount of light emitted from the light source unit based on the detection result by the sensor.

With the foregoing structure, the amount of light emitted from the light source unit can be so adjusted as to improve visibility for the user in accordance with the position of the user.

INDUSTRIAL APPLICABILITY

A planar illumination device and a liquid crystal display device using the same according to the present invention can realize a thin large screen with wide color reproducibility and can realize a liquid crystal display device with high image quality and low power consumption by uniformizing the luminance of the planar illumination device and improving light utilization efficiency, wherefore they are useful in the display field.

What is claimed is:

1. A planar illumination device for illuminating a liquid crystal display panel provided with a polarizing plate on a light incident side, comprising:
    a light source unit for emitting light having a specified polarization direction; and
    a light irradiating member for deflecting light emitted from the light source unit and irradiating the liquid crystal display panel with the deflected light,
    wherein the light irradiating member deflects the light emitted from the light source unit such that the polarization direction of the light emitted from the light source unit substantially coincides with a transmission axis direction of the polarizing plate of the liquid crystal display panel; and
    the light source unit includes either a first light source for emitting light having a polarization direction substantially orthogonal to a surface of the polarizing plate to be incident on the light irradiating member in the transmission axis direction of the polarizing plate or a second light source for emitting light having a polarization direction substantially parallel to the surface of the polarizing plate to be incident on the light irradiating member in a direction orthogonal to the transmission axis direction of the polarizing plate.

2. A planar illumination device according to claim 1, wherein:
    the light source includes the first light source and the second light source; and
    lights from the first and second light sources are incident on the light irradiating member in directions orthogonal to each other.

3. A planar illumination device according to claim 2, wherein:
    the light irradiating member is a light guide plate having a first end surface substantially vertical to a transmission axis of the polarizing plate, a second end surface orthogonal to the first end surface, a first principal surface from which incident lights through the first and second end surfaces are emitted, and a second principal surface facing the first principal surface.

4. A planar illumination device according to claim 3, wherein:
    the light guide plate includes thereof a plurality of isotropic scattering elements for deflecting the respective lights emitted from the first and second light sources.

5. A planar illumination device according to claim 4, wherein:
    the plurality of scattering elements are formed within the light guide plate at uniform intensities.

6. A planar illumination device according to claim 3, wherein:
    a plurality of fine members for deflecting the respective lights emitted from the first and second light sources in directions toward the first principal surface are formed on the second principal surface of the light guide plate;
    each of the plurality of fine members has a first reflecting surface having a normal in a virtual plane vertical to the first principal surface and orthogonal to the first end surface and a second reflecting surface having a normal in a virtual plane vertical to the first principal surface and orthogonal to the second end surface; and
    the first and second reflecting surfaces reflect the lights respectively emitted from the first and second light sources toward the first principal surface.

7. A planar illumination device according to claim 6, wherein:
    the plurality of fine members are identical and periodically formed on the second principal surface.

8. A planar illumination device according to claim 3, wherein:
    the light guide plate further includes a polarization hologram layer arranged on the second principal surface and adapted to align the polarization directions of the respective lights emitted from the first and second light sources so that the polarization directions of the respective lights emitted from the first and second light sources substantially coincide with the transmission axis direction of the liquid crystal display panel.

9. A planar illumination device according to claim 2, wherein:
    the light irradiating member is a reflecting plate having a flat surface provided on a side of the liquid crystal display panel, a first side substantially vertical to the transmission axis direction of the polarizing plate and a second side orthogonal to the first side and adapted to reflect the respective lights emitted from the first and second light sources on the flat surface to be outputted to the side of the liquid crystal display panel.

10. A planar illumination device according to claim 9, wherein:
    a plurality of fine members for deflecting the respective lights emitted from the first and second light sources in directions to the side of the liquid crystal display panel are formed on the flat surface;
    each of the plurality of fine members has a first reflecting surface having a normal in a virtual plane vertical to the flat surface and orthogonal to the first side and a second reflecting surface having a normal in a virtual plane vertical to the flat surface and orthogonal to the second side; and
    the first and second reflecting surfaces reflect the lights emitted from the first and second light sources toward the liquid crystal display panel.

11. A planar illumination device according to claim 10, wherein the plurality of fine members are identical and periodically formed on the flat surface.

12. A planar illumination device according to claim 2, further comprising:
    a half wave plate for rotating the polarization direction of light emitted from the light source unit; and
    a polarization beam splitter for splitting the light having passed through the half wave plate into first and second polarization components, transmitting light of the first polarization component and reflecting light of the second polarization component, wherein the polarization beam splitter is provided so as to face the second principal surface of the light guide plate and emits either one of the lights of the first and second polarization components as a light emitted from the first light source while emitting the other as a light emitted from the second light source.

13. A planar illumination device according to claim 2, further comprising:

a light guide for guiding light emitted from the light source unit; and a polarization beam splitter for splitting the light guided by the lightguide into first and second polarization components, transmitting light of the first polarization component and reflecting light of the second polarization component;

wherein the polarization beam splitter is provided so as to face the second principal surface of the light guide plate and emits either one of the lights of the first and second polarization components as a light emitted from the first light source while emitting the other as a light emitted from the second light source.

14. A planar illumination device according to claim 2, wherein:

either one of the first and second light sources emits a green light; and the other one of the first and second light sources emits red and blue lights.

15. A planar illumination device according to claim 2, wherein:

either one of the first and second light sources emits a blue light; and the blue light is emitted in a direction substantially parallel to the shorter one of two sides of the first principal surface orthogonal to each other.

16. A planar illumination device according to claim 1, wherein:

the light source unit is a laser light source unit.

17. A planar illumination device according to claim 1, wherein:

the light source unit includes LED devices and a polarizing element for polarizing lights emitted from the LED devices in a predetermined direction.

18. A planar illumination device according to claim 12, further comprising:

a controller for controlling the half wave plate, wherein the controller changes a ratio of the lights of the first and second polarization components split by the polarization beam splitter by rotating the polarization direction of the light emitted from the light source unit using the half wave plate.

19. A liquid crystal display device, comprising:

a planar illumination device according to claim 1; and a liquid crystal display panel to be illuminated by the planar illumination device, wherein a polarization direction of light irradiated from the planar illumination device substantially coincides with a transmission axis of the polarizing plate.

20. A liquid crystal display device according to claim 19, further comprising:

a sensor for detecting the position of a user viewing an image displayed on the liquid crystal display panel and an adjuster for adjusting an amount of light emitted from the light source unit based on a result of detection by the sensor.

* * * * *